US012655786B2

(12) United States Patent
Jyouzaki et al.

(10) Patent No.: US 12,655,786 B2
(45) Date of Patent: Jun. 16, 2026

(54) OFF-ROAD VEHICLE

(71) Applicant: KAWASAKI MOTORS, LTD., Hyogo (JP)

(72) Inventors: Takahiro Jyouzaki, Akashi (JP); Kengo Shimatani, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 19/042,089

(22) Filed: Jan. 31, 2025

(65) Prior Publication Data

US 2025/0172089 A1 May 29, 2025

Related U.S. Application Data

(63) Continuation-in-part of application No. 18/230,164, filed on Aug. 4, 2023.

(51) Int. Cl.
*F02B 29/04* (2006.01)

(52) U.S. Cl.
CPC ................................ *F02B 29/0443* (2013.01)

(58) Field of Classification Search
CPC .... F02B 29/04; F02B 29/0406; F02B 29/045; F02B 29/0443; F02B 33/44
See application file for complete search history.

(56) References Cited

U.S. PATENT DOCUMENTS

| | | | | |
|---|---|---|---|---|
| 10,315,510 | B2 | 6/2019 | Toupin et al. | |
| 2019/0186345 | A1* | 6/2019 | Joyce | F02B 29/045 |
| 2022/0228522 | A1* | 7/2022 | Kang | F01P 3/20 |

FOREIGN PATENT DOCUMENTS

| | | | | | |
|---|---|---|---|---|---|
| DE | 102015214107 | A1 * | 2/2017 | | F02B 33/44 |
| JP | 6601150 | B2 * | 11/2019 | | |
| JP | 6613777 | B2 * | 12/2019 | | |
| KR | 19980033972 | U * | 9/1998 | | F02M 35/10255 |

OTHER PUBLICATIONS

U.S. Appl. No. 18/230,164, filed Aug. 4, 2023.

* cited by examiner

*Primary Examiner* — Ngoc T Nguyen
(74) *Attorney, Agent, or Firm* — XSENSUS LLP

(57) ABSTRACT

An off-road vehicle includes: a supercharger including an outflow tubular portion including an outflow port; an inter-cooler including an intercooler core and an inlet tank that includes an inlet tubular portion and is adjacent to one side of the intercooler core in a width direction; and an upstream intake duct connecting the outflow tubular portion of the supercharger to the inlet tank of the intercooler. The outflow tubular portion of the supercharger, the inlet tubular portion of the intercooler, and the upstream intake duct are located at a first side of a vertical center line of the intercooler.

20 Claims, 25 Drawing Sheets

OFF-ROAD VEHICLE

CROSS-REFERENCE TO RELATED APPLICATION

The present application is a continuation-in-part application of application Ser. No. 18/230,164, filed Aug. 4, 2023, the entire contents of which are incorporated herein by reference.

BACKGROUND OF THE INVENTION

Field of the Invention

The present disclosure relates to an off-road vehicle including a supercharger.

Description of the Related Art

U.S. Pat. No. 10,315,510 B2 discloses an off-road vehicle. This off-road vehicle includes: a turbocharger that increases the pressure of intake air to be supplied to an engine; and an intercooler that cools the intake air which has been compressed by the turbocharger. The turbocharger is connected to the intercooler through a first pipe, and the intercooler is connected to a throttle body through a second pipe.

SUMMARY OF THE INVENTION

An off-road vehicle according to one aspect of the present disclosure includes: a supercharger including a pressurization rotating body, an accommodating portion that defines a pressurizing space accommodating the pressurization rotating body, and an outflow tubular portion including an outflow port communicating with the pressurizing space; an intercooler including an intercooler core and an inlet tank that includes an inlet tubular portion and is adjacent to one side of the intercooler core in a width direction; and an upstream intake duct connecting the outflow tubular portion of the supercharger to the inlet tank of the intercooler. One side of a vertical center line, which passes through a width-direction center of the intercooler and extends in a vertical direction, in the width direction is referred to as a first side, and the other side of the vertical center line in the width direction is referred to as a second side. The outflow tubular portion of the supercharger, the inlet tubular portion of the intercooler, and the upstream intake duct are located at the first side of the vertical center line.

An off-road vehicle according to another aspect of the present disclosure includes: a supercharger including a pressurization rotating body, an accommodating portion that defines a pressurizing space accommodating the pressurization rotating body, and an outflow tubular portion including an outflow port communicating with the pressurizing space; an intercooler including an intercooler core, an inlet tank that includes an inlet tubular portion and is adjacent to one side of the intercooler core in a width direction, and an outlet tank that includes an outlet tubular portion and is adjacent to the other side of the intercooler core in the width direction; an intake tank including a tank portion that defines an intake chamber and an inflow tubular portion that protrudes from the tank portion and includes an inflow port communicating with the intake chamber; an upstream intake duct connecting the outflow tubular portion of the supercharger to the inlet tank of the intercooler; and a downstream intake duct that connects the outlet tubular portion of the outlet tank of the intercooler to the inflow tubular portion of the intake tank. The outflow tubular portion of the supercharger is located closer to the inlet tubular portion of the intercooler than to the outlet tubular portion of the intercooler in the width direction.

DETAILED DESCRIPTION

An embodiment will be described by referring to the accompanying drawings. In the following description, directions are based on an off-road vehicle 1 unless otherwise defined individually. Specifically, a front-rear direction corresponds to a vehicle length direction of the off-road vehicle 1, and a right-left direction corresponds to a width direction of the off-road vehicle 1.

Figure 1:
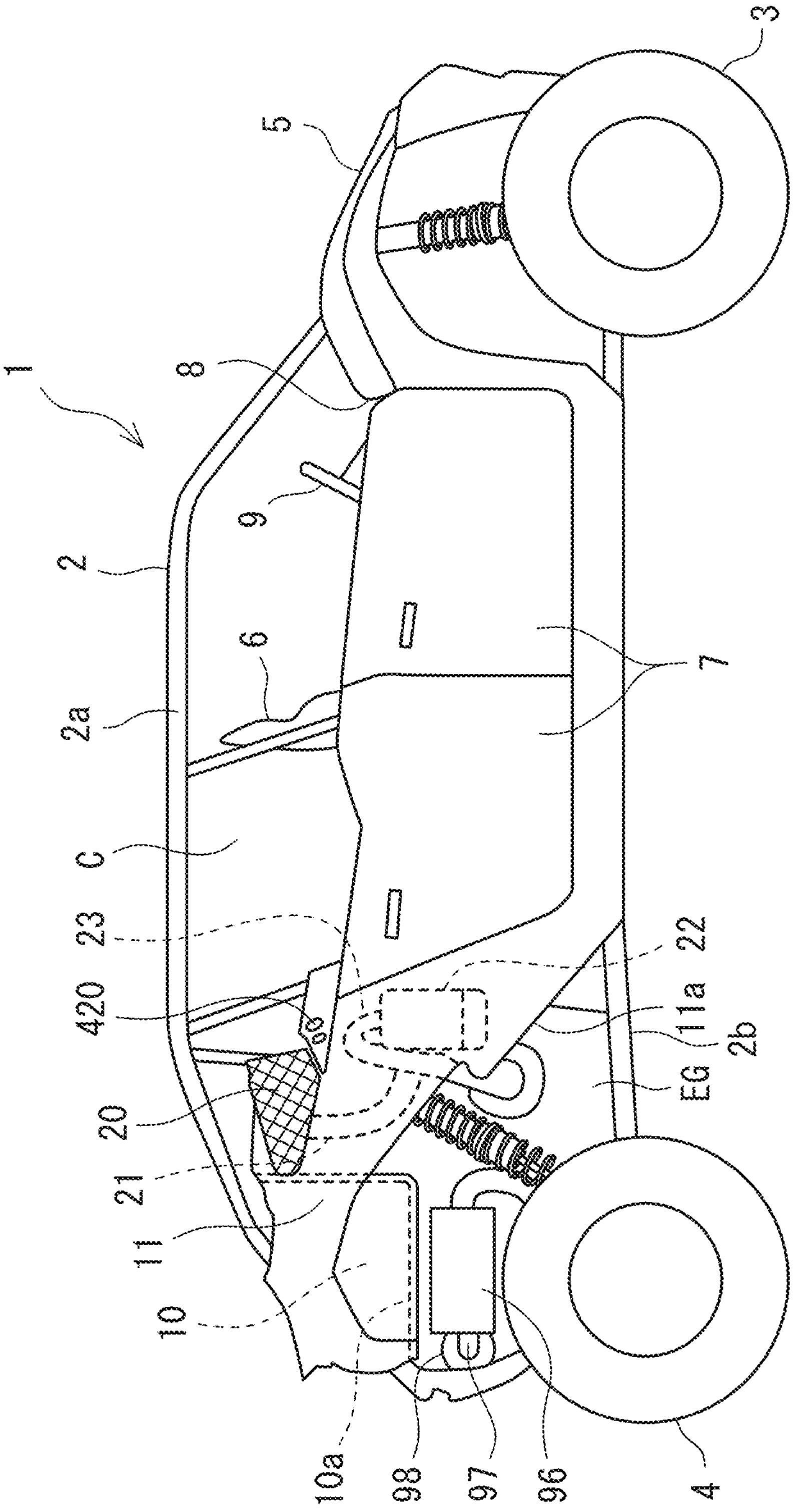
FIG. 1 is a right side view of an off-road vehicle according to an embodiment.

FIG. 1 is a right side view of the off-road vehicle 1 according to this embodiment. As illustrated in FIG. 1, the off-road vehicle 1 includes a vehicle body frame 2, a pair of right and left front wheels 3, and a pair of right and left rear wheels 4. The pair of front wheels 3 support a front portion of the vehicle body frame 2. The pair of rear wheels 4 support a rear portion of the vehicle body frame 2. The vehicle body frame 2 is a pipe frame made up of a plurality of pipes connected to each other. The front wheels 3 and the rear wheels 4 each include a balloon tire for irregular ground travel purposes. There is a space between the right and left front wheels 3. The space is covered by a hood 5 from above the space.

A passenger seat 6 is provided behind the hood 5. The passenger seat 6 is supported by the vehicle body frame 2 and includes a driver seat. The vehicle body frame 2 includes elements such as a cabin frame 2*a*. The cabin frame 2*a* surrounds a cabin C, where the passenger seat 6 is provided. The cabin C is exposed to the outside. Side doors 7 are provided at one side of the cabin C. A dash panel 8 is provided in front of the driver seat. A handle 9 is provided on the dash panel 8 and protrudes toward the driver seat. It is preferable that the cabin frame serve as a rollover protective structure (ROPS).

A cargo bed 10 is provided behind the cabin frame 2*a*. The cargo bed 10 is supported by a rear frame 2*b* (see FIG. 4) of the vehicle body frame 2. The cargo bed 10 defines a storage space S. The storage space S has a depressed shape and is open to the outside. An engine room ER is provided behind the cabin frame 2*a* and under the cargo bed 10. The engine room ER is partially covered by a side cowl 11. The side cowl 11 is exposed outward in a width direction of the off-road vehicle 1. The side cowl 11 is supported by the rear frame 2*b* (see FIG. 4) of the vehicle body frame 2.

In the engine room ER, an internal combustion engine EG and a continuously variable transmission TM are provided. The internal combustion engine EG includes a plurality of cylinders. The continuously variable transmission TM changes in speed the driving force output from the internal combustion engine EG. The internal combustion engine EG and the continuously variable transmission TM are supported by the rear frame 2*b* of the vehicle body frame 2. The internal combustion engine EG has an intake port connected to an intake system 13 and an exhaust port connected to an exhaust system 14. The intake system 13 includes an air cleaner 22. The air cleaner 22 is covered by the side cowl 11 at an outer side of the air cleaner 22 in the width direction of the off-road vehicle 1, and is hidden in a side view of the off-road vehicle 1. That is, the air cleaner 22 and the side cowl 11 overlap in a side view of the off-road vehicle 1. The side cowl 11 each have a cutout portion 11*a*. Through cutout portion 11*a*, the engine room ER is partially exposed outward in the width direction of the off-road vehicle 1.

Discharge ports 420 through which heat in the engine room ER is discharged are located at an upper portion of the side cowl 11. For example, the discharge ports 420 are portions located outside occupant seats 6 in the width direction of the off-road vehicle 1 and extending in an upper-lower direction and are located on a dividing wall that separates the engine room ER and a vehicle outside space from above. One discharge port 420 is located outside the right occupant seat 6 in the width direction of the off-road vehicle 1, and another discharge port 420 is located outside the left occupant seat 6 in the width direction of the off-road vehicle 1.

Figure 2:
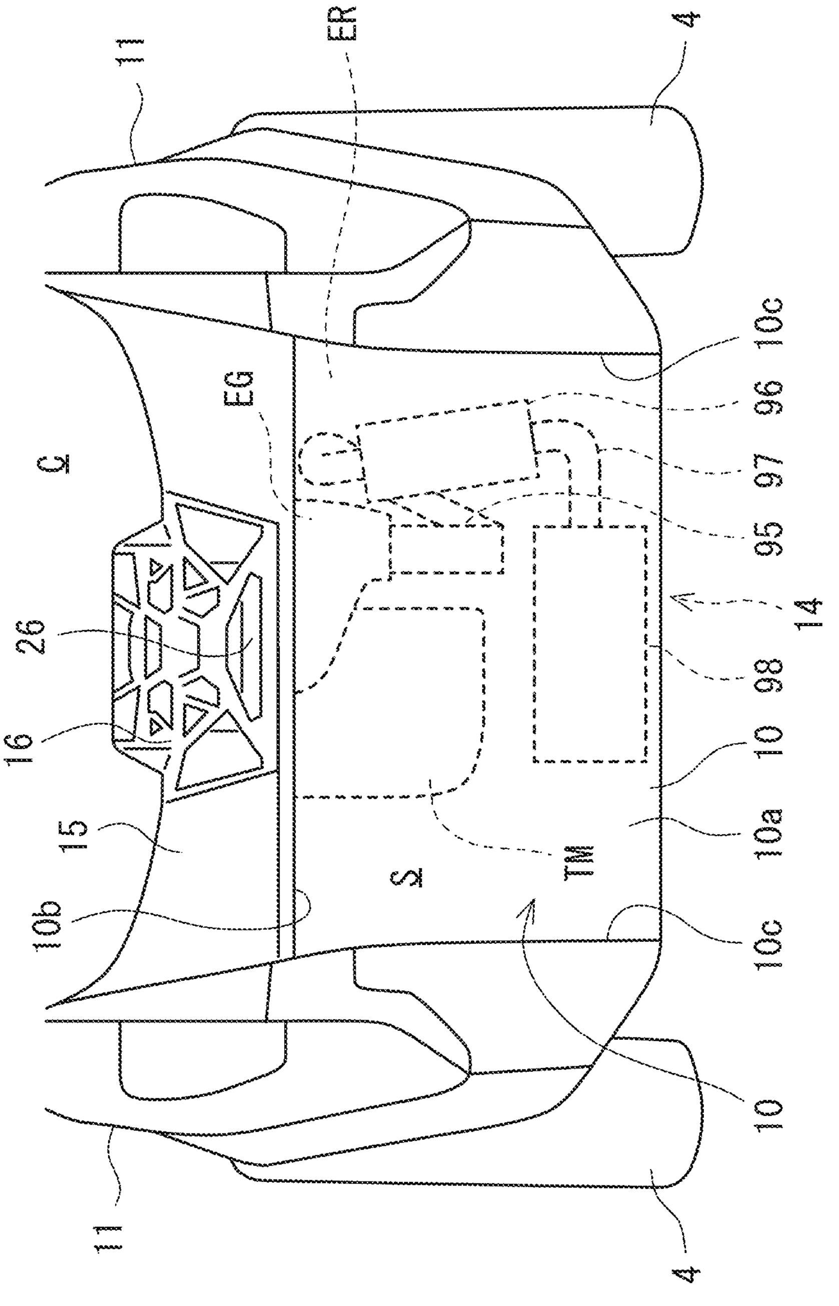
FIG. 2 is a top view of a rear portion of the off-road vehicle illustrated in FIG. 1.

FIG. 2 is a top view of a rear portion of the off-road vehicle 1 illustrated in FIG. 1. As illustrated in FIG. 2, the cargo bed 10 of the off-road vehicle 1 has a bottom wall 10*a*, a front wall 10*b*, and a pair of side walls 10*c*. The front wall 10*b* protrudes upward from a front side of the bottom wall 10*a*. One of the side walls 10*c* protrudes upward from a right side of the bottom wall 10*a*, and the other of the side walls 10*c* protrudes upward from a left side of the bottom wall 10*a*. That is, the storage space S of the cargo bed 10 is defined by the bottom wall 10*a*, the front wall 10*b*, and the pair of side walls 10*c*, and is open upward and rearward.

The engine room ER is covered by the cargo bed 10 and an engine room cover 15 from above the engine room ER. The engine room cover 15 is provided between the cabin C and the cargo bed 10 in the front-rear direction. The engine room cover 15 is provided over the internal combustion engine EG. The engine room cover 15 has a window opening WD. The window opening WD is open in a vertical direction. Through the window opening WD, an intercooler 26 (see FIG. 5) is exposed. The intercooler 26 is provided in the engine room ER. A protection cover 16 is mounted on the engine room cover 15. The protection cover 16 covers the window opening WD from above the window opening WD.

The internal combustion engine EG and the continuously variable transmission TM overlap the engine room cover 15 and the bottom wall 10*a* of the cargo bed 10 in a top view of the off-road vehicle 1. The exhaust system 14 is provided immediately under the bottom wall 10*a* of the cargo bed 10. The exhaust system 14 includes a first exhaust pipe 95, a first muffler 96, a second exhaust pipe 97, and a second muffler 98. The first muffler 96 and the second muffler 98 are provided immediately under the bottom wall 10*a* of the cargo bed 10. The first exhaust pipe 95 is connected to the exhaust port of the internal combustion engine EG. The first muffler 96 is connected to the first exhaust pipe 95. The second exhaust pipe 97 is connected to the first muffler 96. The second muffler 98 is connected to the second exhaust pipe 97. With this configuration, exhaust gas discharged through the exhaust port of the internal combustion engine EG passes through the first exhaust pipe 95, the first muffler 96, the second exhaust pipe 97, and the second muffler 98, in this order, and is discharged into ambient air through the second muffler 98. Details of the exhaust system 14 will be described later.

Figure 3:
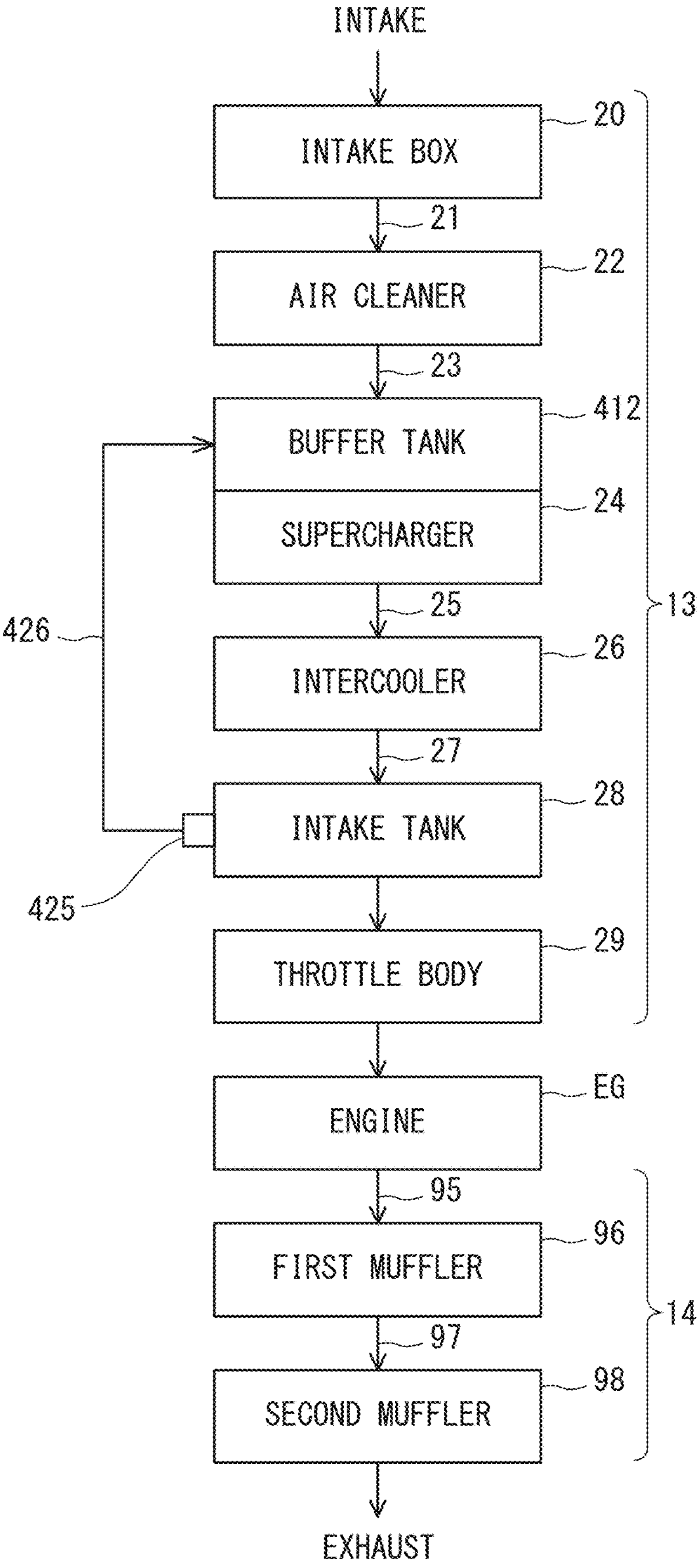
FIG. 3 is a block diagram of an intake system and an exhaust system of the off-road vehicle illustrated in FIG. 1.

FIG. 3 is a block diagram of the intake system 13 and the exhaust system 14, which serve for the internal combustion engine EG of the off-road vehicle 1 illustrated in FIG. 1. As illustrated in FIG. 3, the intake system 13 includes an intake box 20, a first intake duct 21, the air cleaner 22, a second intake duct 23, a buffer tank 412, a supercharger 24, a third intake duct 25, the intercooler 26, a fourth intake duct 27, an intake tank 28, and a throttle body 29. The pressure of the intake air is increased by the supercharger 24, and this generates force by which air is sucked into the supercharger 24. Thus, regardless of negative pressure generated at the intake port of the internal combustion engine EG, ambient air is absorbed into the intake box 20.

The intake air in the intake box 20 passes through the first intake duct 21, the air cleaner 22, the second intake duct 23, the buffer tank 412, the supercharger 24, the third intake duct 25, the intercooler 26, the fourth intake duct 27, the intake tank 28, and the throttle body 29, in this order, and enters the intake port of the internal combustion engine EG through the throttle body 29.

The intake box 20 includes a filter which is located at an inlet of the intake box 20 and prevents sand, small stones, and the like from entering the intake box 20. The intake box 20 includes a storing space that stores the intake air. The intake box 20 includes the storing space which is located downstream of the inlet and upstream of an outlet of the intake box 20 and has a channel section larger than the outlet. Since the ambient air is stored in the storing space of the intake box 20, the lack of the amount of intake air when the output of the internal combustion engine EG increases rapidly is prevented.

The air cleaner 22 includes a filter whose mesh is finer than that of the intake box 20. The air cleaner 22 filters the intake air with the filter to prevent foreign matters from flowing to the downstream side. The entry of foreign matters into the internal combustion engine EG is suitably prevented by both of the intake box 20 and the air cleaner 22, i.e., by a two-stage filtering function.

The buffer tank 412 includes a storing space that stores the intake air. The buffer tank 412 includes the storing space which is located downstream of an inlet of the buffer tank 412 and upstream of an outlet of the buffer tank 412 and has a channel section larger than the outlet. The sectional area of the inlet of the buffer tank 412 is larger than that of the outlet of the buffer tank 412. Since the storing space that can adequately store the intake air is located between the supercharger 24 and the air cleaner 22, the lack of the amount of intake air when the output of the internal combustion engine EG increases rapidly is prevented.

The intercooler 26 cools the intake air which has been increased in pressure by the supercharger 24. The intercooler 26 cools the intake air by heat exchange with ambient air. Thus, the charging efficiency of the intake air charged to the intake port of the internal combustion engine EG improves, and this improves the output of the internal combustion engine EG. The intake tank 28 includes a storing space that stores the intake air. The intake tank 28 includes the storing space which is located downstream of an inlet of the intake tank 28 and upstream of an outlet of the intake tank 28 and has a channel section larger than the inlet and the outlet. The throttle body 29 includes a throttle valve that adjusts the amount of intake air to be introduced to the internal combustion engine EG, in accordance with the operation of the driver, the traveling state, or the state of the engine. Since the throttle body 29 is located downstream of the intake tank 28, the responsiveness of the output of the internal combustion engine EG with respect to the change in the opening degree of the throttle valve can be improved.

The intake tank 28 is connected to a return tube 426 through a relief valve 425. When internal pressure of the intake tank 28 exceeds allowable pressure, such as when the throttle valve is suddenly closed, the relief valve 425 opens to release the internal pressure of the intake tank 28 to a passage located upstream of the supercharger 24, for example, to the buffer tank 412. Thus, the pressure of the intake air flowing through the intake system 13 is prevented from exceeding the allowable pressure.

The exhaust system 14 includes the first exhaust pipe 95, the first muffler 96, the second exhaust pipe 97, and the second muffler 98. The exhaust gas discharged through the exhaust port of the internal combustion engine EG passes through the first exhaust pipe 95, the first muffler 96, the second exhaust pipe 97, and the second muffler 98, in this order, and is discharged into ambient air through the second muffler 98.

Figure 4:
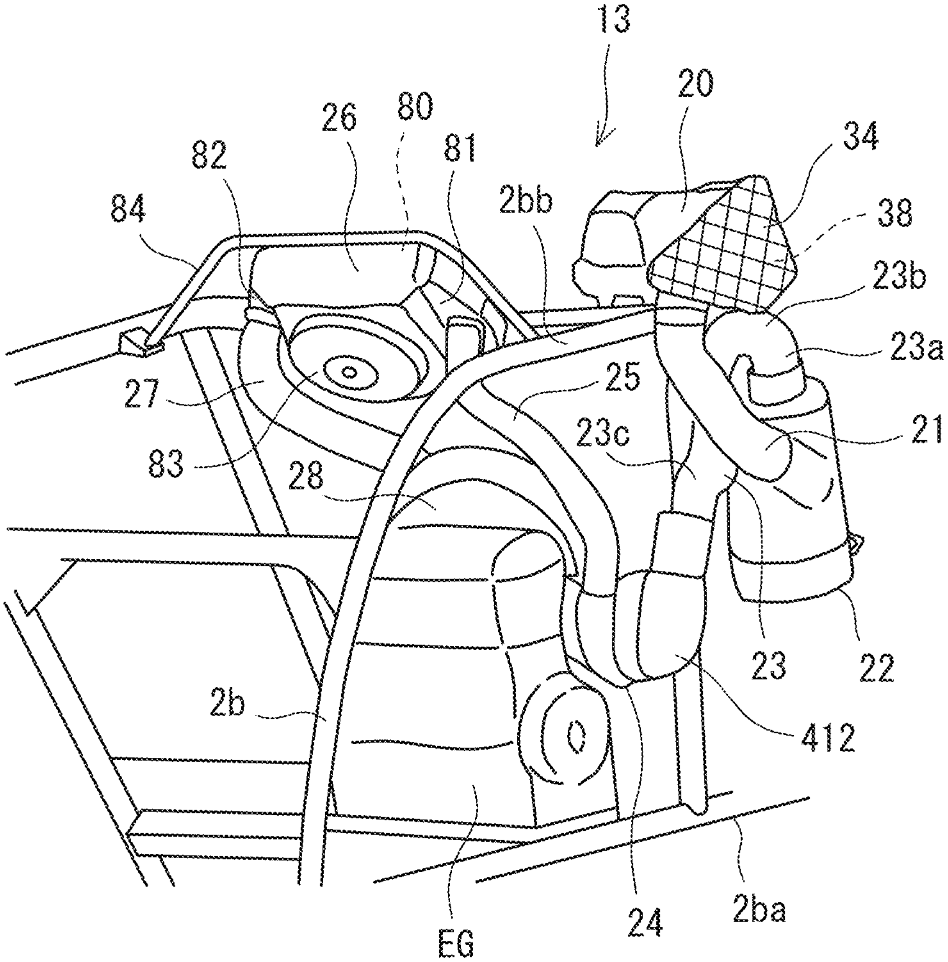
FIG. 4 is a diagonally right rear view of the intake system of the off-road vehicle illustrated in FIG. 1.
Figure 5:
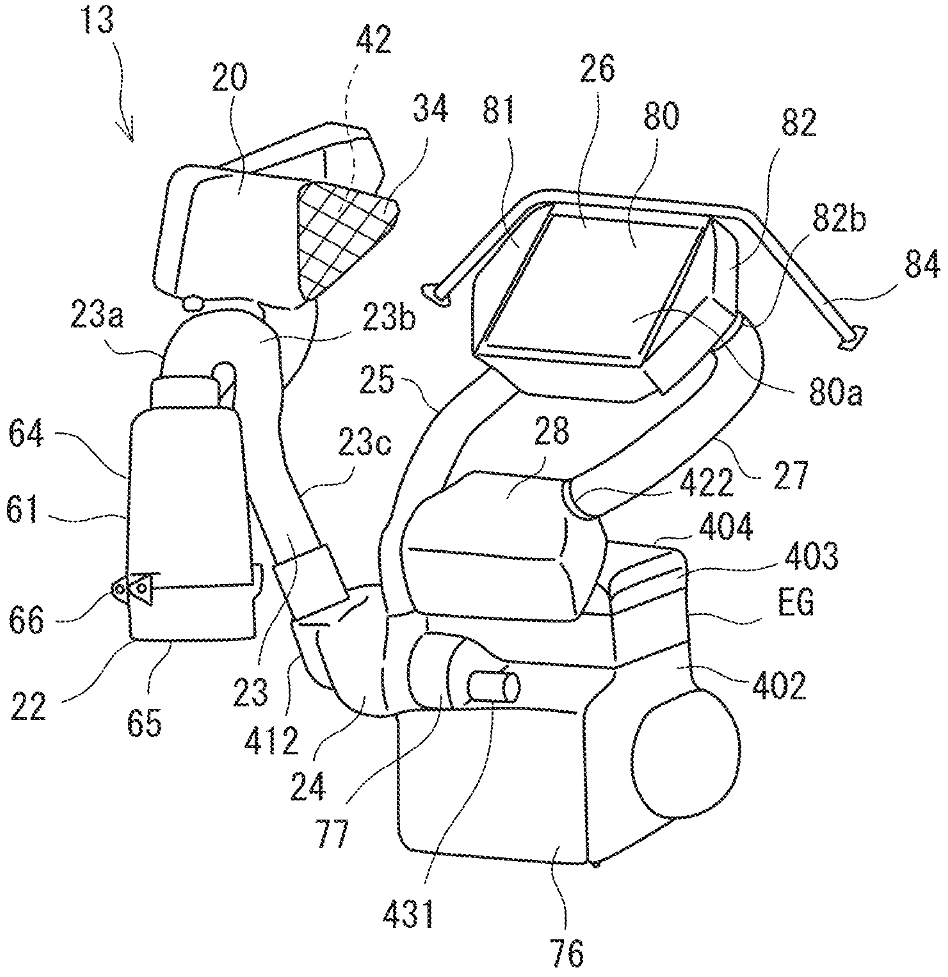
FIG. 5 is a diagonally left front view of the intake system illustrated in FIG. 4.

FIG. 4 is a diagonally right rear view of the intake system 13 of the off-road vehicle 1 illustrated in FIG. 1. FIG. 5 is a diagonally left front view of the intake system 13 illustrated in FIG. 4. In FIGS. 4 and 5, the continuously variable transmission TM is not shown. As illustrated in FIGS. 4 and 5, the internal combustion engine EG and the intake system 13 are supported by the rear frame **2*b* of the vehicle body frame 2. The rear frame 2*b* includes a lower frame 2*ba* and an upper frame 2*bb*. The upper frame 2*bb* is provided above the lower frame 2*ba*. The internal combustion engine EG is provided above the lower frame 2*ba* and below the upper frame 2*bb*. The intake box 20 and the intercooler 26 are provided at positions higher than the internal combustion engine EG. The intake box 20 and the intercooler 26 are provided at positions higher than the upper frame 2*bb*. The air cleaner 22 is provided at a position higher than the internal combustion engine EG. The intake box 20 is provided at a position higher than the air cleaner 22**.

As illustrated in FIG. 1, the intake box 20 is provided at a position higher than the side doors 7. The intake box 20 is provided behind the cabin C and in front of the storage space S of the cargo bed 10. The air cleaner 22 is provided at a position higher than the rear wheels 4.

As illustrated in FIGS. 4 and 5, the internal combustion engine EG and the intercooler 26 are provided approximately at a center of the off-road vehicle 1 in its width direction. The intake box 20 and the air cleaner 22 are provided at one side of the off-road vehicle 1 in its width direction. For example, the intake box 20 and the air cleaner 22 are provided at the right side of the off-road vehicle 1. The air cleaner 22 is located away from a cylinder block 402 of the internal combustion engine EG in the width direction of the off-road vehicle 1. In the present embodiment, the air cleaner 22 is located away from a right side surface of the cylinder block 402 in a right direction. In the present embodiment, the air cleaner 22 has a tubular shape extending in the vertical direction. An upper end of the air cleaner 22 is located higher than an upper end of the internal combustion engine EG, and a lower end of the air cleaner 22 is located lower than a cylinder head cover 404 that is the upper end of the internal combustion engine EG. The air cleaner 22 includes an outflow port at the upper end and an inflow port at a position lower than the upper end. The outflow port of the air cleaner 22 is located higher than an inflow port of the supercharger 24. As above, the intake box 20, the first intake duct 21, the air cleaner 22, the second intake duct 23, and the buffer tank 412 are located outside a side surface, which faces outward in the width direction of the off-road vehicle 1, of the cylinder block 402 in the width direction of the off-road vehicle 1. In the present embodiment, the intake box 20, the first intake duct 21, the air cleaner 22, the second intake duct 23, and the buffer tank 412 are located at a right side of the side surface of the cylinder block 402 in the width direction of the off-road vehicle 1.

In the top view, the intake tank 28 is located at the cylinder block 402 so as to be closer to the intake port of the internal combustion engine EG than to the exhaust port of the internal combustion engine EG. In other words, in the top view, the intake tank 28 is located so as to be displaced from the cylinder head cover 404. In the present embodiment, the intake tank 28 is displaced forward from the cylinder head cover 404. An upper end of the intake tank 28 is located higher than the cylinder head cover 404. In the present embodiment, the lower end of the air cleaner 22 is located lower than the upper end of the internal combustion engine EG.

The intake box 20 and the air cleaner 22 are provided further outward than the rear frame **2*b* in the width direction of the off-road vehicle 1. The supercharger 24 is provided below the air cleaner 22. The supercharger 24 is provided at a height where the supercharger 24 and the internal combustion engine EG overlap. The supercharger 24 is provided at one side of the internal combustion engine EG and in front of the internal combustion engine EG. The supercharger 24 is driven by, for example, motive power extracted from the internal combustion engine EG. The supercharger 24** is a supercharger including an impeller that rotates by driving force supplied from a crank shaft of the internal combustion engine EG, but may be a turbocharger.

A power transmission unit 77 is provided in a crankcase 76 of the internal combustion engine EG. The power transmission unit 77 contains a power transmission mechanism that is power-transmittably connected to the crank shaft in the crankcase 76 and that is connected to a drive shaft of the supercharger 24. With this configuration, the drive force of the crank shaft of the internal combustion engine EG is input to the supercharger 24 through the power transmission unit 77. In the present embodiment, the power transmission mechanism of the power transmission unit 77 is a below-described speed increasing structure 470. A starter motor 431 that is an example of a rotary structure is connected to the power transmission unit 77.

The intake box 20 has an internal space 33. The intake box 20 has a plurality of first openings 38. The internal space 33 communicates with the outside of the off-road vehicle 1 through the first openings 38. The first openings 38 of the intake box 20 are covered by a filter 34. The intake box 20 is connected to the air cleaner 22 via the first intake duct 21. The air cleaner 22 is connected to the supercharger 24 via the second intake duct 23.

The second intake duct 23 is provided at a height included in the height range of the first intake duct 21. The second intake duct 23 includes a first portion **23*a*, a second portion 23*b*, and a third portion 23*c*. The first portion 23*a* of the second intake duct 23 protrudes upward from the air cleaner 22. The second portion 23*b* of the second intake duct 23 is curved downward from the first portion 23*a*. That is, the second portion 23*b* has an inversed U shape. The third portion 23*c* extends toward the supercharger 24 from the second portion 23*b* and is connected to the supercharger 24. This configuration ensures that the air cleaner 22, which is provided above the supercharger 24, can be provided near the supercharger 24 in a horizontal direction, increasing the degree of layout freedom in the interior of the off-road vehicle 1**.

The supercharger 24 is connected to the intercooler 26 via the third intake duct 25. The intercooler 26 is provided along an intake conduit extending from the supercharger 24 toward the internal combustion engine EG, and is provided above the internal combustion engine EG. The intercooler 26 includes an intercooler core 80, an inlet tank 81, and an outlet tank 82. The intercooler core 80 has an upper surface that faces forward and upward. With this configuration, a rear edge of the upper surface of the intercooler core 80 is higher than a front edge of the upper surface of the intercooler core 80. The intercooler 26 is supported by the upper frame **2*bb* of the rear frame 2*b* via a bracket 84. The third intake duct 25 is connected to the inlet tank 81 of the intercooler 26. The outlet tank 82 of the intercooler 26 is connected to the intake tank 28 via the fourth intake duct 27**.

The inlet tank 81 is adjacent to one side of the intercooler core 80 in the width direction of the off-road vehicle 1, and is fluidally connected to the intercooler core 80. The outlet tank 82 is adjacent to the other side of the intercooler core 80 in the width direction of the off-road vehicle 1, and is fluidally connected to the intercooler core 80. Air from the supercharger 24 flows through the third intake duct 25 and enters the inlet tank 81. The air inside the inlet tank 81 flows into the intercooler core 80. The air flows through the intercooler core 80 and flows into the outlet tank 82. The air flowing inside the intercooler core 80 is cooled by heat exchange with ambient air. This configuration ensures that the air heated at the supercharger 24 is cooled at the intercooler 26, and the cooled air is supplied to the internal combustion engine EG. As a result, intake charging efficiency improves in the internal combustion engine EG.

Figure 6:
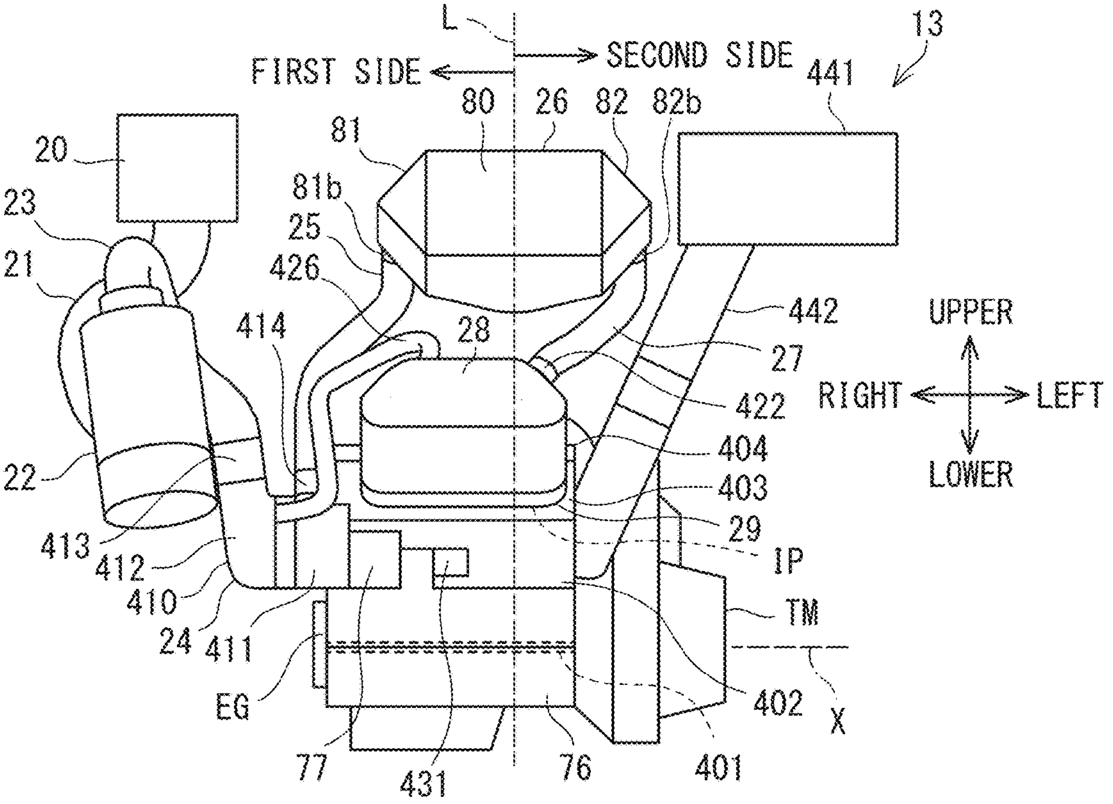
FIG. 6 is a front view of the intake system illustrated in FIG. 5 when viewed from front.
Figure 7:
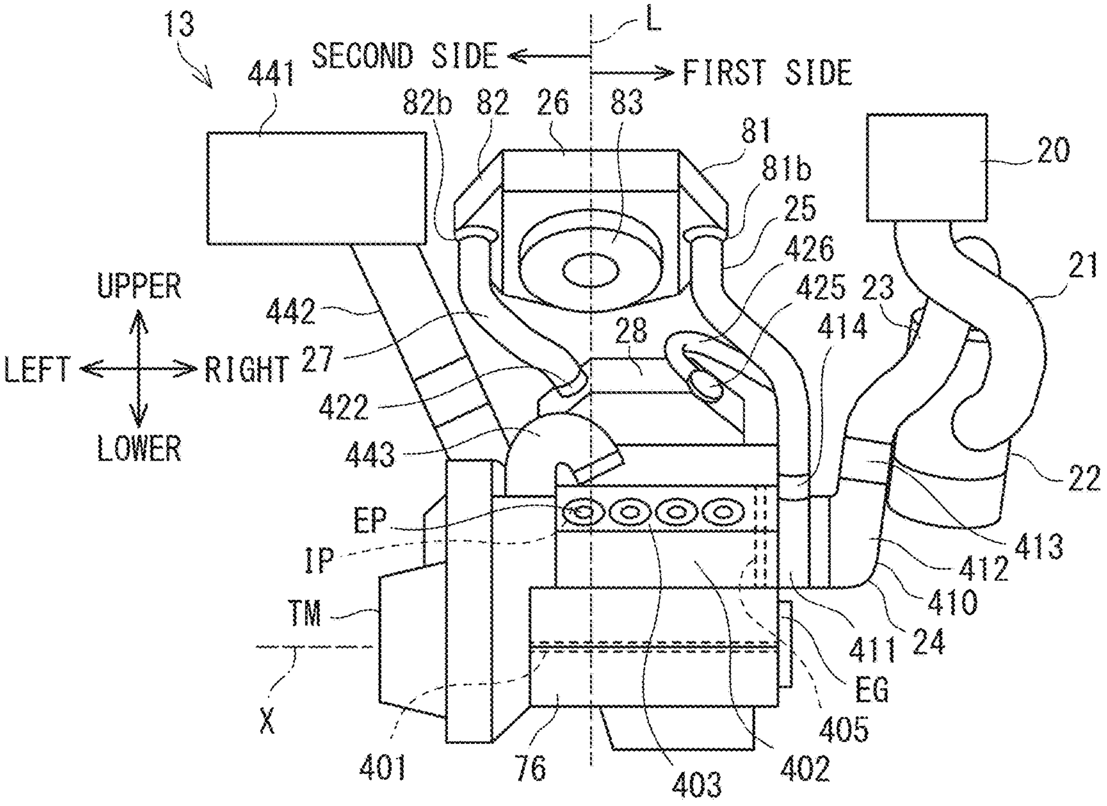
FIG. 7 is a rear view of the intake system illustrated in FIG. 6 when viewed from behind.

FIG. 6 is a front view of the intake system 13 illustrated in FIG. 5. FIG. 7 is a rear view of the intake system 13 illustrated in FIG. 6. As illustrated in FIGS. 6 and 7, the internal combustion engine EG includes the crankcase 76, the cylinder block 402, a cylinder head 403, and the cylinder head cover 404. The crankcase 76 accommodates the crank shaft 401 extending in the width direction of the off-road vehicle 1. In the present embodiment, a rotational axis direction X in which a rotational axis X of the crank shaft 401 extends is the width direction of the off-road vehicle 1.

The cylinder block 402 protrudes upward from the crankcase 76 and includes the cylinders. The cylinder head 403 is placed on the cylinder block 402 from above to define a combustion chamber and includes intake ports IP and exhaust ports EP which are connected to the combustion chamber. The cylinder head cover 404 is placed on the cylinder head 403 from above and covers a valve gear. The valve gear drives intake valves that open and close the intake ports IP and exhaust valves that open and close the exhaust ports EP. In the present embodiment, an axial direction Y (see FIG. 11) of the cylinder of the cylinder block 402 is the vertical direction.

The supercharger 24 is located at a side, where the intake ports IP exist, of the internal combustion engine EG, i.e., at a front side of the internal combustion engine EG. Thus, the temperature increase of the supercharger 24 is suppressed as compared to when the supercharger 24 is located at a side, where the exhaust ports EP exist, of the internal combustion engine EG.

The supercharger 24 overlaps the internal combustion engine EG from front. A impeller housing 410 of the supercharger 24 is located outside all of the intake ports IP in the rotational axis direction X in which the rotational axis X of the crank shaft 401 extends, i.e., in the width direction of the off-road vehicle 1. Thus, the supercharger 24 is prevented from largely occupying a space located adjacent to the internal combustion engine EG in a horizontal direction orthogonal to the crank shaft 401. In the present embodiment, the supercharger 24 is prevented from largely occupying the space adjacently located at the front side of the internal combustion engine EG. Therefore, a power unit including the internal combustion engine EG and the supercharger 24 is reduced in size, and this improves the degree of freedom of the layout of the parts mounted on the off-road vehicle 1.

At least part of the supercharger 24 is located outside the cylinder block 402 in the width direction of the off-road vehicle 1. In the present embodiment, part of the supercharger 24 overlaps the cylinder block 402 in the front-rear direction of the off-road vehicle 1, and the rest of the supercharger 24 is located outside the cylinder block 402 in the width direction of the off-road vehicle 1. Thus, the supercharger 24 is prevented from largely occupying the space located adjacent to the internal combustion engine EG in the front-rear direction of the off-road vehicle 1.

The cylinder block 402 includes a cam chain tunnel 405 at one end portion thereof in the width direction of the off-road vehicle 1. A cam chain is located in the cam chain tunnel 405. The cam chain transmits the driving force of the crank shaft 401 to the valve gear that drives the intake valves that open and close the intake ports IP and the exhaust valves that open and close the exhaust ports EP. The cam chain tunnel 405 is located at a portion of the cylinder block 402 which is adjacent to the supercharger 24. In the present embodiment, the cam chain tunnel 405 is located at a right end of the cylinder block 402, i.e., at a side where the supercharger 24 is located. Influence of the heat applied from the internal combustion engine EG to the supercharger 24 is reduced by the existence of the cam chain tunnel 405.

The impeller housing 410 of the supercharger 24 is located between the air cleaner 22 and the cylinder block 402 in the width direction of the off-road vehicle 1. Thus, the dimension of the second intake duct 23 that connects the air cleaner 22 to the supercharger 24 can be reduced in the width direction of the off-road vehicle 1. The second intake duct 23 and the third intake duct 25 are located outside the cylinder block 402 in the width direction of the off-road vehicle 1. Therefore, the second intake duct 23 and the third intake duct 25 can be easily prevented from interfering with the cylinder block 402.

The intercooler 26 is located vertically above the internal combustion engine EG. The inlet tank 81 of the intercooler 26 includes an inlet tubular portion **81*b* including an inlet. The outlet tank 82 of the intercooler 26 includes an outlet tubular portion 82*b* including an outlet. The supercharger 24 includes an outflow tubular portion 414 including an outflow port 414*a* that faces upward. The third intake duct 25 connects the outflow tubular portion 414 of the supercharger 24 to the inlet tubular portion 81*b* of the intercooler 26 and extends in the vertical direction. Since the outflow port 414*a* of the outflow tubular portion 414 of the supercharger 24 faces upward, a space occupied in the horizontal direction by the third intake duct 25 that connects the supercharger 24 to the intercooler 26** is reduced.

The power transmission unit 77 and the starter motor 431 are lined up in the width direction of the off-road vehicle 1. When viewed in the front-rear direction of the off-road vehicle 1, the power transmission unit 77 and the starter motor 431 are located so as to overlap the internal combustion engine EG. Thus, the parts that accompany the internal combustion engine EG are compactly located. The power transmission unit 77 is located vertically under the throttle body 29. Thus, since the power transmission unit 77 is located by effectively utilizing a space located vertically under the throttle body 29, the power transmission unit 77 is prevented from becoming a hindrance for the other parts.

The intake tank 28 includes an inflow tubular portion 422 including an inflow port. The fourth intake duct 27 connects the outlet tubular portion **82*b* of the outlet tank 82 of the intercooler 26 to the inflow tubular portion 422 of the intake tank 28. From the viewpoint of the intercooler 26, the third intake duct 25 is an upstream intake duct, and the fourth intake duct 27 is a downstream intake duct. Herein, when viewed in the front-rear direction of the off-road vehicle 1, one side of a vertical center line L, which passes through a width-direction center of the intercooler 26 and extends in the vertical direction, in the width direction of the off-road vehicle 1 is referred to as a first side, and the other side of the vertical center line L in the width direction of the off-road vehicle 1 is referred to as a second side. In the present embodiment, the width direction of the intercooler 26 coincides with the width direction of the off-road vehicle 1. The vertical center line L passing through the width-direction center of the intercooler 26 is located at one side, which is away from the supercharger 24, of a vehicle-width-direction center of the internal combustion engine EG. A vehicle-width-direction center of the intercooler 26 is located at one side, which is away from the supercharger 24**, of the vehicle-width-direction center of the internal combustion engine EG.

When viewed in the front-rear direction of the off-road vehicle 1, the outflow tubular portion 414 of the supercharger 24, the inlet tubular portion **81*b* of the intercooler 26, and the third intake duct 25 are located at the first side of the vertical center line L. In the present embodiment, the entire third intake duct 25 is located at the first side of the vertical center line L. According to this configuration, the size of the third intake duct 25 in the width direction of the off-road vehicle 1** can be reduced, and this can realize the efficient layout of the parts.

When viewed in the front-rear direction of the off-road vehicle 1, the outlet tubular portion **82*b* of the intercooler 26, the inflow tubular portion 422 of the intake tank 28, and the fourth intake duct 27 are located at the second side of the vertical center line L. In the present embodiment, the entire fourth intake duct 27 is located at the second side of the vertical center line L. According to this configuration, the size of the fourth intake duct 27 in the width direction of the off-road vehicle 1** can be reduced, and this can realize the efficient layout of the parts.

The outflow tubular portion 414 of the supercharger 24 is located outside the inlet tubular portion **81*b* of the intercooler 26 in the width direction of the off-road vehicle 1. Thus, the third intake duct 25 can be located away from the intercooler core 80. The outflow tubular portion 414 of the supercharger 24 is closer to the inlet tubular portion 81*b* of the intercooler 26 than to the outlet tubular portion 82*b* of the intercooler 26 in the width direction of the off-road vehicle 1. Thus, the size of the second intake duct 23 in the width direction of the off-road vehicle 1** can be reduced.

The inflow tubular portion 422 of the intake tank 28 is closer to the vertical center line L in the width direction of the off-road vehicle 1 than the outlet tubular portion **82*b* of the intercooler 26 is. Thus, while preventing the curvature radius of the fourth intake duct 27 from being reduced, the fourth intake duct 27 can be prevented from occupying a large space in the width direction of the off-road vehicle 1, and the fourth intake duct 27 is prevented from interfering with other parts. The third intake duct 25 and the fourth intake duct 27 are located above the internal combustion engine EG. The third intake duct 25 and the fourth intake duct 27 are connected to a lower portion of the intercooler 26**.

A transmission intake duct 442 and a transmission exhaust duct 443 are connected to the continuously variable transmission TM. The transmission intake duct 442 defines an intake conduit that communicates with an internal space of the continuously variable transmission TM. An inlet of the transmission intake duct 442 is connected to an intake box 441 that takes in ambient air. The intake box 441 includes a filter that purifies ambient air by allowing the ambient air to pass through the filter. The transmission exhaust duct 443 defines an exhaust conduit that communicates with the internal space of the continuously variable transmission TM. The air which has flowed from the intake box 441 through the transmission intake duct 442 into the internal space of the continuously variable transmission TM cools the parts, such as a belt of the continuously variable transmission TM, and is then discharged through the transmission exhaust duct 443 to the atmosphere.

The continuously variable transmission TM is adjacent to the internal combustion engine EG in the width direction of the off-road vehicle 1 and is located at the second side of the vertical center line L. The transmission intake duct 442 and the transmission exhaust duct 443 are located at the same side of the vertical center line L as the fourth intake duct 27 in the width direction of the off-road vehicle 1. The transmission intake duct 442 and the transmission exhaust duct 443 are located outside the fourth intake duct 27 in the width direction of the off-road vehicle 1. The inflow tubular portion 422 of the intake tank 28 is closer to the vertical center line L than the outlet tubular portion 82*b* of the intercooler 26 is, and when viewed in the front-rear direction of the off-road vehicle 1, the fourth intake duct 27 and the transmission intake duct 442 extend outward in the width direction of the off-road vehicle 1 and diagonally upward.

In the width direction of the off-road vehicle 1, a center of the intercooler 26 is displaced from a center of the cylinder block 402. Therefore, while reducing a distance between the intake tank 28 and the intercooler 26, the curvature radius of the fourth intake duct 27 can be prevented from being reduced.

The outlet tubular portion 82*b* of the intercooler 26 located above the intake tank 28 is located farther away from the vertical center line L toward the second side than the inflow tubular portion 422 of the intake tank 28 and is away from the inflow tubular portion 422 of the intake tank 28 toward one side in the front-rear direction of the off-road vehicle 1. The inflow tubular portion 422 of the intake tank 28 protrudes diagonally upward with respect to the horizontal direction so as to face one side in the front-rear direction of the off-road vehicle 1 and the second side of the vertical center line L. In the present embodiment, the outlet tubular portion 82*b* of the intercooler 26 is located at a rear left side of the inflow tubular portion 422 of the intake tank 28. The inflow tubular portion 422 of the intake tank 28 protrudes diagonally upward with respect to the horizontal direction so as to face a rear left side.

Figure 8:
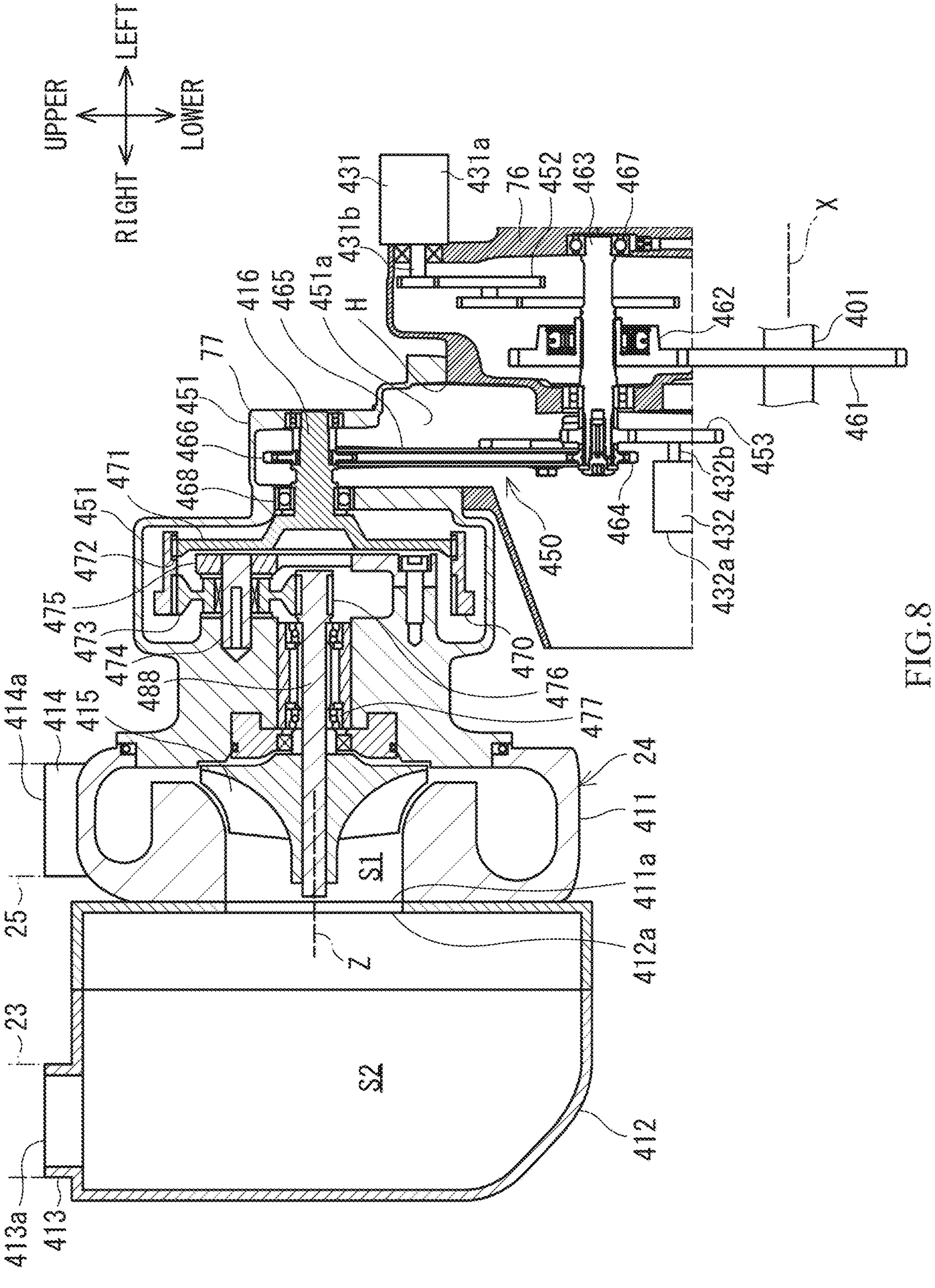
FIG. 8 is a vertical sectional view showing a supercharger of FIG. 7 and its vicinity.

FIG. 8 is a vertical sectional view showing the supercharger 24 of FIG. 7 and its vicinity. As illustrated in FIG. 8, the supercharger 24 includes: an impeller 415; an impeller shaft 488 that transmits rotational power to the impeller 415; the impeller housing 410 accommodating the impeller 415 and including an inflow port 411*a* and the outflow port 414*a*; a bearing 477 that is located at the left side of the impeller housing 410 in the width direction of the off-road vehicle 1 and rotatably supports the impeller shaft 488; the speed increasing structure 470 that increases the speed of the rotational power transmitted from the crank shaft 401 and transmits the rotational power to the impeller shaft 488; and a gear case 451 that accommodates the bearing 477 and the speed increasing structure 470. The supercharger 24 generates centrifugal force by the rotation of the impeller 415 and pushes out the taken-in air outward in a radial direction while pressurizing the air.

The impeller housing 410 of the supercharger 24 includes an accommodating portion 411 and the outflow tubular portion 414. The accommodating portion 411 defines a pressurizing space S1 that accommodates the impeller 415 that is an example of a pressurization rotating body. The impeller 415 is fixed to the impeller shaft 488. The pressure of the intake air to be supplied to the internal combustion engine EG is increased by the rotation of the impeller 415. The impeller 415 is of a centrifugal compression type. However, a blade of an axial compression type may be used as another example of the pressurization rotating body. The accommodating portion 411 includes the inflow port 411*a* that is located on a rotational axis Z of the impeller 415 and is opposed to the impeller 415. A direction in which the rotational axis Z of the impeller 415 extends is referred to as a rotational axis direction Z. An outer shape of the impeller housing 410 is such a shape that a radial dimension of the impeller housing 410 decreases as the impeller housing 410 extends from the outflow port 414*a* in a direction opposite to a rotational direction of the impeller 415. In the present embodiment, the outer shape of the impeller housing 410 is larger than the outer shape of the gear case 451 in a radial direction orthogonal to the rotational axis Z.

The buffer tank 412 is connected to the accommodating portion 411 of the impeller housing 410. The buffer tank 412 is fixed to the impeller housing 410. The buffer tank 412 is adjacent to the accommodating portion 411 in the rotational axis direction Z of the impeller 415. In the present embodiment, the buffer tank 412 is adjacent to the accommodating portion 411 from an outside in the width direction of the off-road vehicle 1. The buffer tank 412 defines a buffer space S2. The buffer tank 412 includes an outflow port 412*a* that overlaps the inflow port 411*a* of the accommodating portion 411. The buffer space S2 communicates with the pressurizing space S1 through the outflow port 412*a* and the inflow port 411*a*.

The inflow tubular portion 413 is located at the buffer tank 412. The inflow tubular portion 413 defines a conduit that communicates with the buffer space S2. The inflow tubular portion 413 protrudes from the buffer tank 412 in a direction orthogonal to the rotational axis direction Z of the impeller 415. Specifically, the inflow tubular portion 413 protrudes upward from the buffer tank 412. The inflow tubular portion 413 includes an inflow port 413*a* that faces upward. The inflow port 413*a* of the inflow tubular portion 413 communicates with the pressurizing space S1 through the buffer space S2. The second intake duct 23 is connected to the inflow tubular portion 413.

In a direction in which the intake air flows from the inflow port 413*a*, specifically in the vertical direction, the size of the buffer space S2 of the buffer tank 412 is larger than the size of the supercharger 24. In a radial direction orthogonal to the rotational axis Z, the buffer space S2 is larger than the inflow port 411*a* of the impeller housing 410. In the rotational axis direction Z, the buffer space S2 is larger than the impeller housing 410. As above, since the adequate buffer space S2 is located between the supercharger 24 and the air cleaner 22, the lack of the amount of intake air when the output of the internal combustion engine EG increases rapidly is prevented.

The outflow tubular portion 414 of the impeller housing 410 defines a conduit that communicates with the pressurizing space S1. The outflow tubular portion 414 protrudes from the accommodating portion 411 in a direction orthogonal to the rotational axis direction Z of the impeller 415. Specifically, the outflow tubular portion 414 protrudes upward from the accommodating portion 411. The outflow tubular portion 414 includes the outflow port 414*a* that faces upward. The third intake duct 25 is connected to the outflow tubular portion 414.

In the rotational axis direction Z of the impeller 415, the buffer space S2 is larger than a conduit of the second intake duct 23. In a direction orthogonal to the rotational axis direction Z of the impeller 415, the buffer space S2 is larger than the outflow port 412*a*. A conduit area of the buffer space S2 is larger than that of the second intake duct 23. The air which has flowed from the second intake duct 23 into the inflow port 413*a* of the inflow tubular portion 413 enters the buffer space S2. When the air flows from the inflow tubular portion 413 into the buffer tank 412, the conduit rapidly increases in size. The air in the buffer space S2 flows into the pressurizing space S1 and is pressurized by the impeller 415. The air pressurized by the impeller 415 flows out from the outflow port 414*a* of the outflow tubular portion 414 to the third intake duct 25. According to this configuration, since the air is pressurized by the impeller 415 after entering the buffer space S2, a large amount of air is efficiently compressed.

The inflow port 413*a* of the inflow tubular portion 413 of the supercharger 24 and the outflow port 414*a* of the outflow tubular portion 414 of the supercharger 24 are located outside the cylinder block 402 and the cylinder head 403 in the width direction of the off-road vehicle 1 (see also FIGS. 6 and 7). Therefore, the second intake duct 23 and the supercharger 24 which are respectively connected to the inflow tubular portion 413 and the outflow tubular portion 414 are easily prevented from interfering with the cylinder block 402 and the cylinder head 403.

The outflow port 414*a* of the impeller housing 410 is located at one side of the impeller shaft 488 which is closer to the intercooler 26, i.e., at an upper side of the impeller shaft 488. The outflow port 414*a* of the impeller housing 410 faces upward. Thus, an upstream end of the third intake duct 25 can be located close to a downstream end of the third intake duct 25, and the length of the third intake duct 25 is easily reduced. Since the outflow port 414*a* of the supercharger 24 faces upward and forward, a lower portion of the third intake duct 25 can be located far from the cylinder block 402, and the cylinder block 402 and the third intake duct 25 can be prevented from interfering with each other. The outflow port 414*a* of the impeller housing 410 is located behind the impeller shaft 488. The outflow port 414*a* of the impeller housing 410 is located between the impeller shaft 488 and the cylinder block 402.

The impeller 415 of the supercharger 24 is mechanically connected to the crank shaft 401 of the internal combustion engine EG and operates in association with the rotation of the crank shaft 401. The driving force of the crank shaft 401 of the internal combustion engine EG is transmitted to the impeller 415 through the speed increasing structure 470. The speed increasing structure 470 increases the speed of the driving force of the crank shaft 401 of the internal combustion engine EG and transmits the driving force to the impeller 415. In the present embodiment, the speed increasing structure 470 is a planetary gear mechanism.

The crankcase 76 includes a through hole H that is open upward. A linkage 450 that transmits the driving force of the crank shaft 401 of the internal combustion engine EG to the planetary gear mechanism 470 is in the through hole H of the crankcase 76 so as to extend in the vertical direction. In the present embodiment, the linkage 450 may be a structure that can relay power. For example, the linkage 450 includes a chain-sprocket mechanism. A portion of the linkage 450 which protrudes from the crankcase 76 to the outside is accommodated in the gear case 451. The gear case 451 is located in front of the cylinder block 402 of the internal combustion engine EG and is adjacent to the supercharger 24 in the width direction of the off-road vehicle 1. The gear case 451 includes an opening 451*a* that opens an internal space of the gear case 451 toward a lower side. The gear case 451 is fixed to the crankcase 76 with bolts so as to cover the through hole H from above.

The linkage 450 includes a drive gear 461, a driven gear 462, a common rotation shaft 463, a drive sprocket 464, a chain 465, a driven sprocket 466, and an input shaft 416.

The drive gear 461 is fixed to the crank shaft 401. The driven gear 462 meshes with the drive gear 461. The driven gear 462 is fixed to the common rotation shaft 463. The common rotation shaft 463 is supported by the crankcase 76 through a bearing 467. The common rotation shaft 463 is parallel to the crank shaft 401 and the input shaft 416. The drive sprocket 464 is fixed to the common rotation shaft 463. The driven sprocket 466 is located above the drive sprocket 464. The driven sprocket 466 is fixed to the input shaft 416. The input shaft 416 is supported by the gear case 451 through a bearing 468. The chain 465 is wound around the drive sprocket 464 and the driven sprocket 466.

The driving force which has been transmitted from the drive gear 461 of the crank shaft 401 to the driven gear 462 rotates the common rotation shaft 463. The rotational power of the common rotation shaft 463 rotates the input shaft 416 through the drive sprocket 464, the chain 465, and the driven sprocket 466. The rotation of the input shaft 416 is transmitted to the impeller shaft 488 through the planetary gear mechanism 470.

The planetary gear mechanism 470 includes: a ring gear 472 including inner teeth; planetary gears 473 including outer teeth that mesh with the ring gear 472; a planetary shaft 474 that rotatably supports the planetary gears 473; a planetary carrier 475 to which the planetary shaft 474 is fixed; and a sun gear 476 including outer teeth that mesh with the planetary gears 473. The input shaft 416 includes a flange 471 including outer teeth that mesh with the ring gear 472. The planetary carrier 475 is fixed to the gear case 451 such that the planetary gears 473 does not revolve. The sun gear 476 is located at an end portion of the impeller shaft 488. A bearing 477 that supports the impeller shaft 488 is accommodated in the gear case 451. The gear case 451 includes a lubricating liquid inlet through which a lubricating liquid is supplied to the planetary gear mechanism 470 and the bearing 477.

The driving force which has been input from the input shaft 416 to the planetary gear mechanism 470 is increased in speed by the planetary gear mechanism 470 and is then transmitted to the impeller shaft 488. Thus, the impeller 415 rotates. When the impeller 415 rotates, the air in the buffer space S2 is sucked into the pressurizing space S1, and the sucked air flows outward in the radial direction of the impeller 415 while being compressed by the rotation of the impeller 415, and is then supplied to the conduit of the outflow tubular portion 414.

The common rotation shaft 463 is connected to the starter motor 431, which is an example of the rotary structure, and an oil pump 432 so as to be able to transmit power to the starter motor 431 and the oil pump 432. The starter motor 431 includes a motor main body 431*a* and a drive shaft 431*b*. The motor main body 431*a* includes a housing that accommodates a rotor and a stator. The motor main body 431*a* is located outside the crankcase 76. The drive shaft 431*b* protrudes from the motor main body 431*a* and is located inside the crankcase 76. The drive shaft 431*b* is connected to the common rotation shaft 463 through a power relay structure 452 so as to be able to transmit power to the common rotation shaft 463. The power relay structure 452 is accommodated in the crankcase 76. The power relay structure 452 includes a gear mechanism. However, the present embodiment is not limited to this. For example, the power relay structure 452 may include a chain-sprocket mechanism.

The oil pump 432 includes a pump main body 432*a* and a driven shaft 432*b*. The oil pump 432 is located inside the crankcase 76. The pump main body 432*a* includes a housing that accommodates a pump mechanism. The driven shaft 432*b* protrudes from the pump main body 432*a*. The common rotation shaft 463 is connected to the driven shaft 432*b* through a power relay structure 453 so as to be able to transmit power to the driven shaft 432*b*. The power relay structure 453 is accommodated in the crankcase 76. The power relay structure 453 includes a gear mechanism. However, the present embodiment is not limited to this. For example, the power relay structure 453 may include a chain-sprocket mechanism.

When the starter motor 431 is driven, the rotational power of the drive shaft 431*b* is transmitted to the crank shaft 401 through the power relay structure 452, the common rotation shaft 463, the driven gear 462, and the drive gear 461, and this can start the internal combustion engine EG. While the internal combustion engine EG is operating, the rotational power of the crank shaft 401 is transmitted to the driven shaft 432*b* through the drive gear 461, the driven gear 462, the common rotation shaft 463, and the power relay structure 453, and this drives the oil pump 432. As above, by effectively utilizing the common rotation shaft 463, a structure related to the starter motor 431 and the oil pump 432 can be compactly located.

Figure 9:
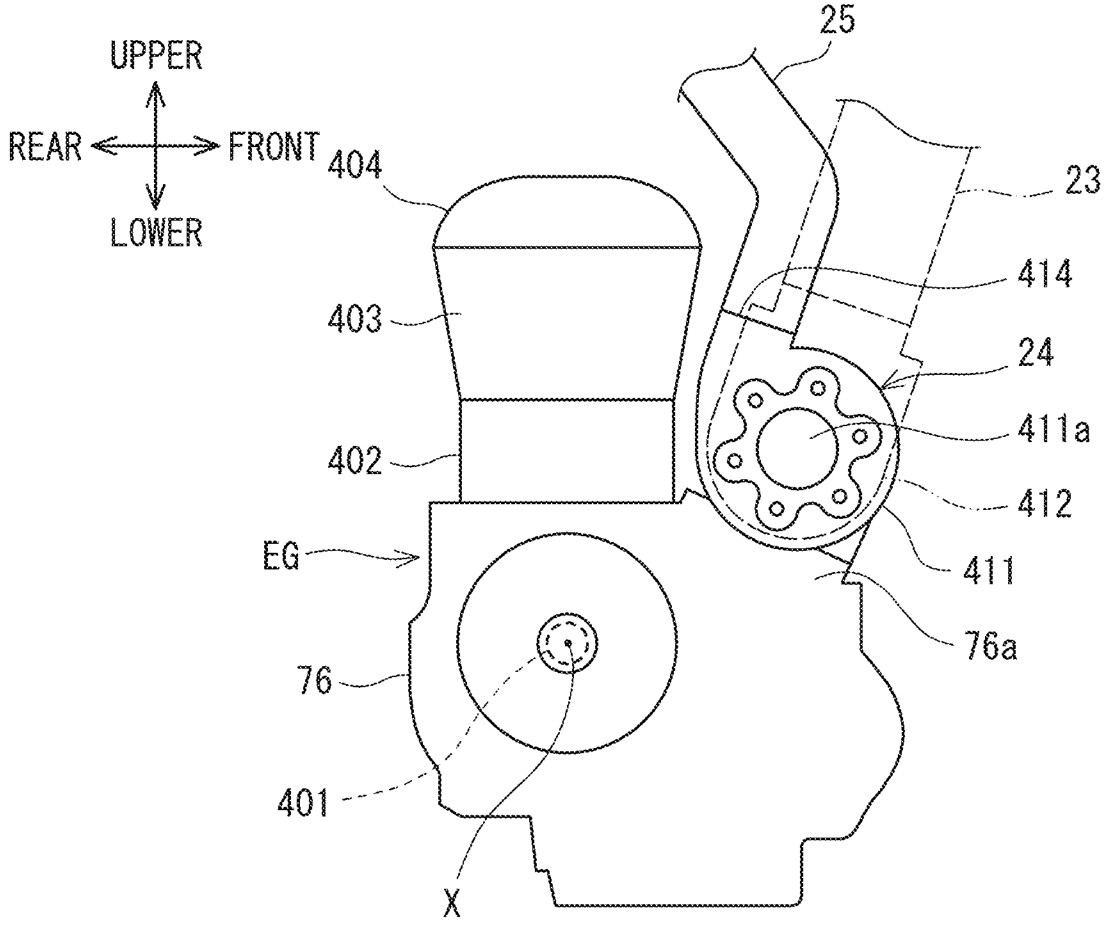
FIG. 9 is a right side view of an internal combustion engine, the supercharger, and the like illustrated in FIG. 4.

FIG. 9 is a right side view of the internal combustion engine EG, the supercharger 24, and the like illustrated in FIG. 4. As illustrated in FIG. 9, the crankcase 76 includes a protruding portion 76*a* that protrudes forward relative to the cylinder block 402. Peripheral parts, such as an oil cooler and the starter motor 431 (see FIG. 8), are attached to the protruding portion 76*a*. The protruding portion 76*a* of the crankcase 76 accommodates the oil pump 432 (see FIG. 8) and a water pump and also accommodates a mechanism that transmits the rotation of the crank shaft 401 to the oil pump 432 and the water pump. The protruding portion 76*a* of the crankcase 76 accommodates a mechanism that transmits the rotation of the starter motor 431 to the crank shaft 401.

The supercharger 24 is located vertically above the protruding portion 76*a* of the crankcase 76 and behind a front end of the crankcase 76. Therefore, as compared to when the supercharger 24 is located behind the crankcase 76, an entire assembly including the supercharger 24 and the internal combustion engine EG is prevented from being increased in size. Specifically, the gear case 451 of the supercharger 24 is located vertically above the protruding portion 76*a* of the crankcase 76.

The impeller housing 410 of the supercharger 24 is displaced from the cylinder head 403 in the vertical direction. In the present embodiment, the impeller housing 410 is located lower than the cylinder head 403. When viewed in the rotational axis direction X of the crank shaft 401, the impeller housing 410 is located away from the cylinder block 402. The impeller housing 410 is located higher than the protruding portion 76*a* of the crankcase 76. In other words, the inflow port 411*a* of the impeller housing 410 is located in front of a front end of the cylinder block 402 and higher than an upper end of the crankcase 76. Thus, heat transferred from the cylinder block 402 to the impeller housing 410 is reduced.

Figure 10:
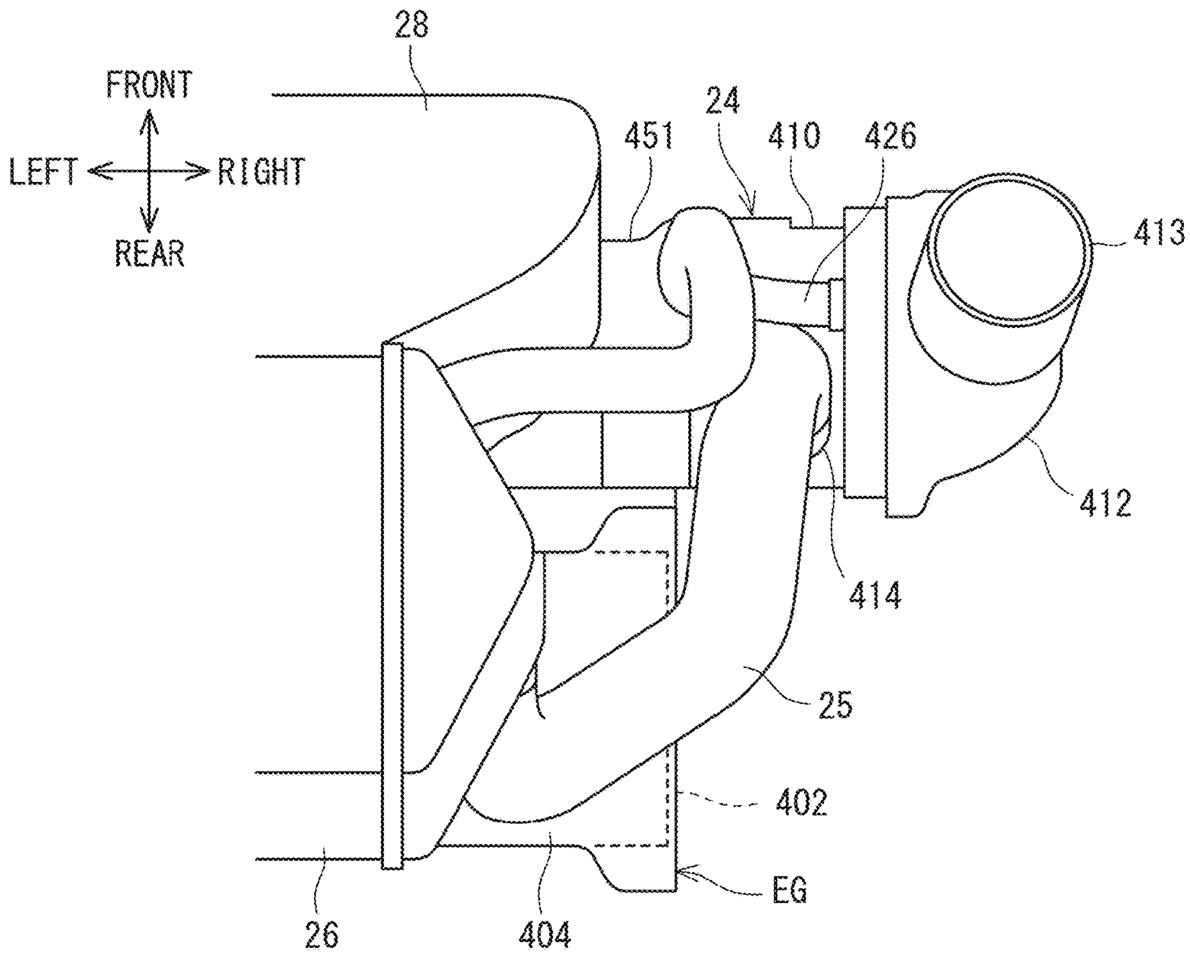
FIG. 10 is a top view of the internal combustion engine, the supercharger, and the like illustrated in FIG. 9.

FIG. 10 is a top view of the internal combustion engine EG, the supercharger 24, and the like illustrated in FIG. 9. As illustrated in FIG. 10, the impeller housing 410 of the supercharger 24 is located outside a side surface, which faces outward in the width direction of the off-road vehicle 1, of the cylinder block 402 in the width direction of the off-road vehicle 1. In the present embodiment, the impeller housing 410 of the supercharger 24 is located at a right side of the side surface of the cylinder block 402. The impeller housing 410 of the supercharger 24 is located outside the cylinder block 402 in the rotational axis direction X of the crank shaft 401, i.e., the width direction of the off-road vehicle 1. The impeller housing 410 of the supercharger 24 is located so as to be displaced from the protruding portion 76*a* (see FIG. 9) of the crankcase 76 in the rotational axis direction X of the crank shaft 401. Thus, the impeller housing 410 can be increased in size while preventing the impeller housing 410 and the crankcase 76 from interfering with each other. Moreover, the third intake duct 25 is prevented from interfering with the throttle body 29 (see FIG. 11) or an intake pipe.

In a top view, the intake tank 28 is located away from the impeller housing 410 of the supercharger 24 in the width direction of the off-road vehicle 1. In other words, the intake tank 28 is in a region that is located at a left side of a right wall of the cylinder block 402 and a right side of a left wall of the cylinder block 402.

Figure 11:
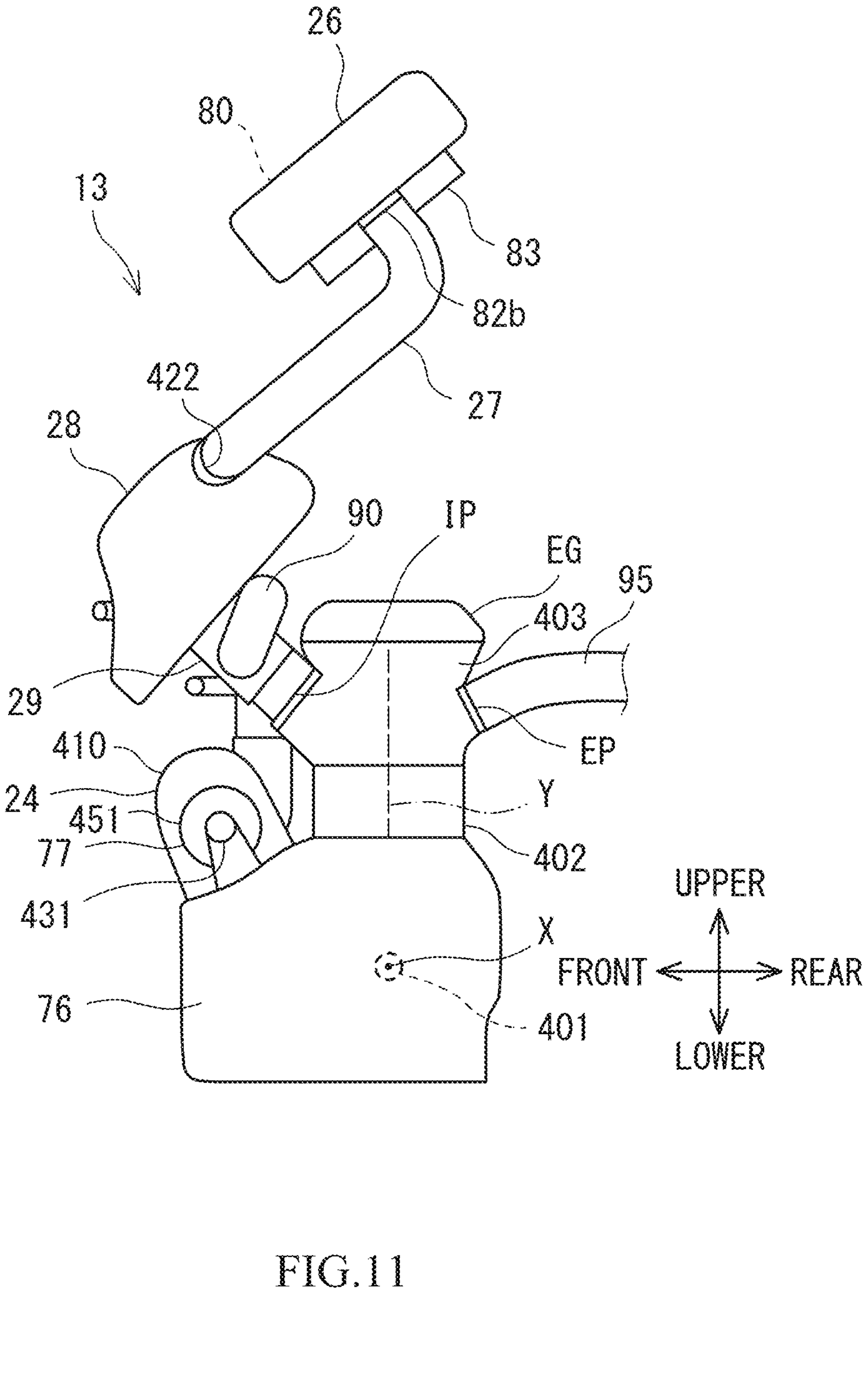
FIG. 11 is a left side view of the internal combustion engine and the intake system illustrated in FIG. 5.

FIG. 11 is a left side view of the internal combustion engine EG and the intake system 13 illustrated in FIG. 5. As illustrated in FIG. 11, the throttle body 29 is connected to the intake port, IP, of the internal combustion engine EG. The throttle body 29 is provided with an electric motor 90. The electric motor 90 drives a throttle valve 89 (see FIG. 26). The intake tank 28 is connected to the throttle body 29. The intake tank 28 defines an intake chamber CH. The intake chamber CH communicates with an intake conduit 88 of the throttle body 29. The electric motor 90 is located at one side of the throttle body 29 in the rotational axis direction X, and the supercharger 24 is located at the other side of the internal combustion engine EG in the rotational axis direction X. Thus, the duct connected to the supercharger 24 and the electric motor 90 can be prevented from interfering with each other.

The intake tank 28 is provided above the throttle body 29. The intake tank 28 is provided immediately above the supercharger 24 in a side view of the off-road vehicle 1. The intercooler 26 is provided above the intake tank 28. The intercooler 26, the intake tank 28, and the throttle body 29 overlap in position in the front-rear direction of the off-road vehicle 1. This overlap configuration ensures that the apparatuses and/or devices associated with the internal combustion engine EG are provided in a compact arrangement in the front-rear direction of the off-road vehicle 1, increasing the degree of layout freedom in the off-road vehicle 1.

The housing 410 of the supercharger 24 is displaced from the cylinder block 402 in a direction orthogonal to the rotational axis X of the crank shaft 401 and a cylinder axis Y of the cylinder block 402, i.e., in the front-rear direction of the off-road vehicle 1. Specifically, the housing 410 of the supercharger 24 is located in front of the cylinder block 402. Thus, the cylinder block 402 and the housing 410 of the supercharger 24 are prevented from interfering with each other while improving the degree of freedom of the layout of the parts.

The intercooler core 80 of the intercooler 26 is displaced from the first exhaust pipe 95 in the horizontal direction. Specifically, the intercooler core 80 is located in front of the first exhaust pipe 95. Thus, the temperature of the intercooler core 80 is prevented from being increased by heat from the first exhaust pipe 95. The intercooler core 80 is located in such a posture as to diagonally extend in a rear-upper direction. A fan 83 of the intercooler 26 is located in such a posture as to discharge air in a rear-lower direction. The first exhaust pipe 95 is located behind and under the intercooler core 80. Thus, the temperature of the intercooler core 80 is prevented from being increased by the heat from the first exhaust pipe 95, and the air discharged from the fan 83 of the intercooler 26 is guided to the first exhaust pipe 95 to suppress the temperature increase of the first exhaust pipe 95.

A rear end of the intercooler core 80 is located in front of a rear end of the cylinder block 402. Since the intercooler core 80 is located in an inclined state, the surface area of the intercooler core 80 can be increased while preventing an increase in the occupied space of the intercooler 26 in the front-rear direction of the off-road vehicle 1. A front end of the intercooler 26 is located in front of a rear end of the intake tank 28. In a top view, a front portion of the intercooler 26 and a rear portion of the intake tank 28 overlap each other. The front end of the intercooler 26 is located in front of a rear end of the impeller housing 410. The third intake duct 25 is located behind a front end of the impeller housing 410.

Figure 12:
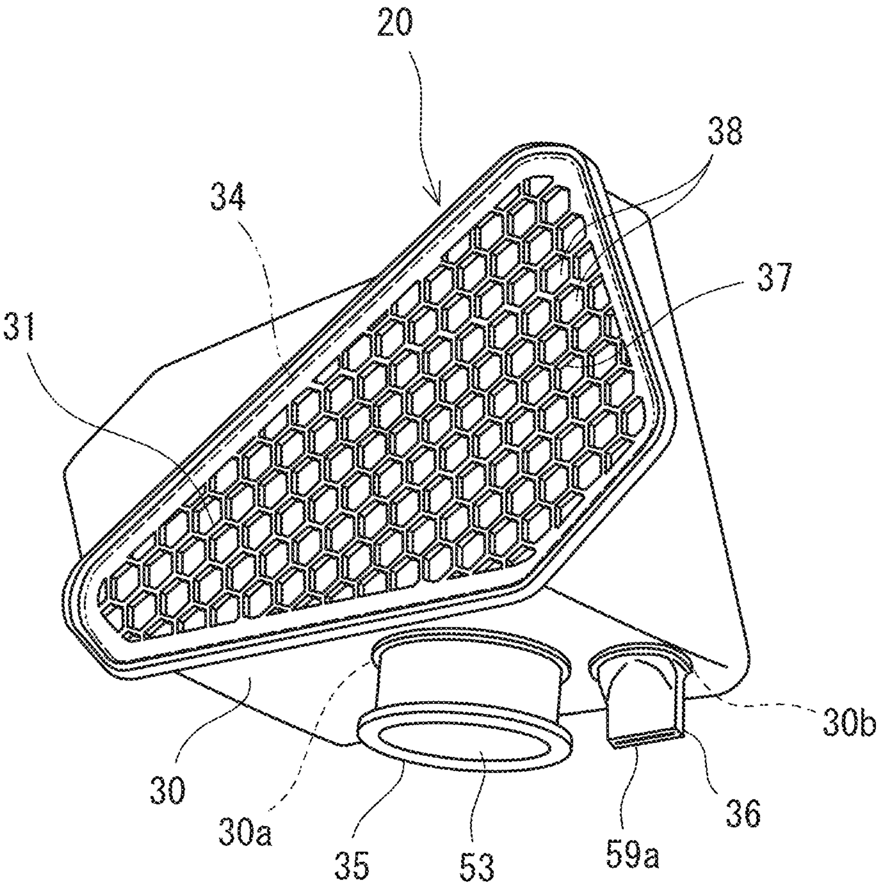
FIG. 12 is a lower right view of an intake box of the off-road vehicle illustrated in FIG. 1.
Figure 13:
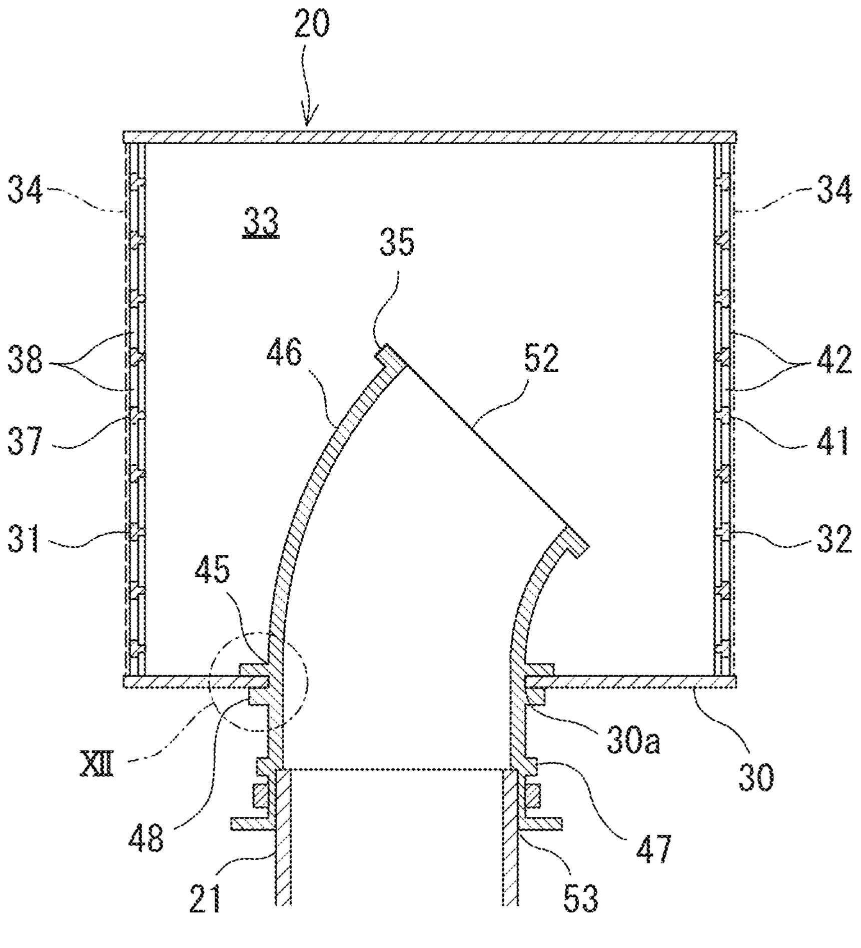
FIG. 13 is a front side cross-sectional view of the intake box illustrated in FIG. 12.

FIG. 12 is a lower right view of the intake box 20 of the off-road vehicle 1 illustrated in FIG. 1. FIG. 13 is a front side cross-sectional view of the intake box 20 illustrated in FIG. 12. As illustrated in FIGS. 12 and 11, the intake box 20 includes a bottom wall 30. The bottom wall 30 has a duct fit hole 30*a* and a drain hole 30*b*. The duct fit hole 30*a* of the bottom wall 30 is fitted with an introduction duct 35. The introduction duct 35 communicates the internal space 33 of the intake box 20 with the first intake duct 21 (see FIG. 4). The drain hole 30*b* of the bottom wall 30 is fitted with an elastic drain nozzle 36. The elastic drain nozzle 36 communicates the internal space 33 of the intake box 20 with the outside of the intake box 20.

The intake box 20 has a right side wall 31 and a left side wall 32. The right side wall 31 protrudes upward from a right side edge of the bottom wall 30 in the width direction of the off-road vehicle 1. The left side wall 32 protrudes upward from a left side edge of the bottom wall 30 in the width direction of the off-road vehicle 1. The intake box 20 has a front wall, a rear wall, and a top wall, in addition to the bottom wall 30, the right side wall 31, and the left side wall 32. The right side wall 31 and the left side wall 32 are meshed walls. In this embodiment, the right side wall 31 will be referred to as first mesh wall 31, and the left side wall 32 will be referred to as second mesh wall 32. The first mesh wall 31 includes frames 37. The frames 37 define the plurality of first openings 38, through which the internal space 33 of the intake box 20 communicates with the outside of the off-road vehicle 1. Similarly, the second mesh wall 32 includes frames 41. The frames 41 define a plurality of second openings 42, through which the internal space 33 of the intake box 20 communicates with the outside of the off-road vehicle 1. Through the first openings 38, the internal space 33 is open outward in the width direction of the off-road vehicle 1. Through the second openings 42, the internal space 33 is open inward in the width direction of the off-road vehicle 1.

The first mesh wall 31 has such a honeycomb structure that the first openings 38 each have a hexagonal shape (see FIG. 12). Similarly, the second mesh wall 32 has such a honeycomb structure that the second openings 42 each have a hexagonal shape. A filter 34 is attached on an outer surface of the first mesh wall 31 of the intake box 20, and another filter 34 is attached on an outer surface of the second mesh wall 32 of the intake box 20. That is, the first openings 38 of the first mesh wall 31 are covered by a filter 34, and the second openings 42 of the second mesh wall 32 are covered by another filter 34.

As illustrated in FIG. 13, the introduction duct 35 includes a fit tubular portion 45, an upper tubular portion 46, and a lower tubular portion 47. The fit tubular portion 45 is fitted with the duct fit hole 30*a* of the bottom wall 30. The fit tubular portion 45 has a ring-shaped recess 48. The ring-shaped recess 48 extends in a circumferential direction of the introduction duct 35 and is open outward in a horizontal direction. The ring-shaped recess 48 is a recess in which a circumferential edge portion of the duct fit hole 30*a* of the bottom wall 30 is inserted. The lower tubular portion 47 protrudes downward from the fit tubular portion 45. The lower tubular portion 47 is provided at the outside of the intake box 20. The lower tubular portion 47, at its lower end, has an outlet 53 for a conduit of the introduction duct 35. An upstream end portion of the first intake duct 21 is attached to the lower tubular portion 47 of the introduction duct 35.

The upper tubular portion 46 protrudes upward from the fit tubular portion 45. The upper tubular portion 46 is provided in the internal space 33 of the intake box 20. That is, the introduction duct 35 protrudes upward from the bottom wall 30 toward the internal space 33. The upper tubular portion 46, at its upper end, has an inlet 52 for the conduit of the introduction duct 35. The inlet 52 of the introduction duct 35 is provided at a position higher than the bottom wall 30 in the internal space 33 of the intake box 20. In this configuration, if dust or water enters the internal space 33 of the intake box 20 through the first openings 38 or the second openings 42, the dust or water accumulates on the bottom wall 30 of the intake box 20 under the dust or water's own weight. Thus, since the inlet 52 is provided at a position higher than the bottom wall 30, it is difficult for dust or water to enter the inlet 52 of the introduction duct 35.

The introduction duct 35 protrudes upward from the bottom wall 30 and is curved in a direction away from the first openings 38. The inlet 52 of the introduction duct 35 faces in a direction away from the first openings 38. The inlet 52 of the introduction duct 35 is oriented in a direction toward the second openings 42. The second openings 42 (toward which the inlet 52 of the introduction duct 35 is oriented) faces inward in the width direction of the off-road vehicle 1. This makes it difficult for dust or water to pass through the second openings 42. Thus, even if dust or water has entered the internal space 33 through the first openings 38, which face outward in the width direction of the off-road vehicle 1, it is difficult for the dust or water to enter the inlet 52 of the introduction duct 35. At the same time, a smooth intake-air flow is maintained in the introduction duct 35.

Figure 14:
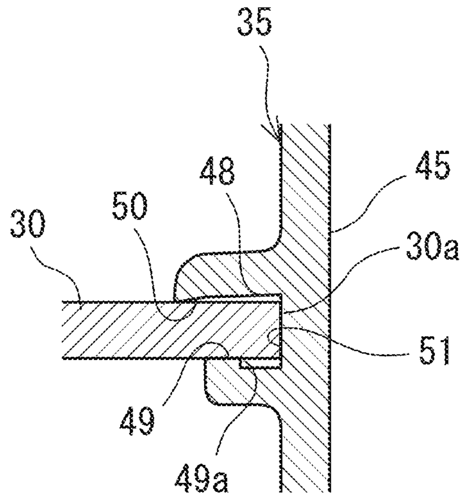
FIG. 14 is an enlarged view of a part XII illustrated in FIG. 13.

FIG. 14 is an enlarged view of a part XII illustrated in FIG. 13. As illustrated in FIG. 14, the ring-shaped recess 48 of the fit tubular portion 45 of the introduction duct 35 has a toroidal lower surface 49, a toroidal upper surface 50, and an outer circumferential surface 51. The upper surface 50 is spaced upward from the lower surface 49 and faces the lower surface 49 in the vertical direction. The outer circumferential surface 51 connects an inner circumferential edge of the lower surface 49 to an inner circumferential edge of the upper surface 50. The lower surface 49 of the ring-shaped recess 48 is in contact with an upper surface of a circumferential edge portion of the duct fit hole 30*a* of the intake box 20. The upper surface 50 of the ring-shaped recess 48 is in contact with a lower surface of the circumferential edge portion of the duct fit hole 30*a* of the intake box 20. The outer circumferential surface 51 of the ring-shaped recess 48 is in contact with an inner circumferential surface of the circumferential edge portion of the duct fit hole 30*a* of the intake box 20.

A ring-shaped step 49*a* is provided on at least one surface among the lower surface 49 of the ring-shaped recess 48, the upper surface 50 of the ring-shaped recess 48, and the outer circumferential surface 51 of the ring-shaped recess 48. The ring-shaped step 49*a* extends in the circumferential direction of the introduction duct 35. In this embodiment, the ring-shaped step 49*a* is provided on the lower surface 49 of the ring-shaped recess 48. The ring-shaped step 49*a* has a radially outward portion and a radially inward portion. The radially outward portion protrudes beyond the radially inward portion toward the bottom wall 30. Thus, the circumferential ring-shaped step 49*a* is formed at the ring-shaped recess 48 of the introduction duct 35. This configuration ensures that even if water enters the ring-shaped recess 48 of the introduction duct 35 from outside the intake box 20, it is difficult for the water to reach the internal space 33 of the intake box 20.

Figure 15:
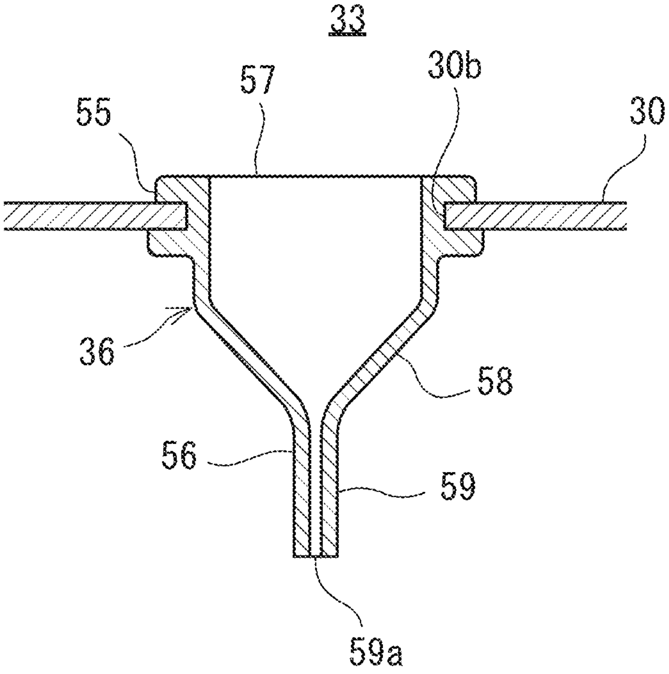
FIG. 15 is a cross-sectional view of an elastic drain nozzle illustrated in FIG. 13.

FIG. 15 is a cross-sectional view of the elastic drain nozzle 36 illustrated in FIG. 12. As illustrated in FIG. 15, the elastic drain nozzle 36 includes a fit tubular portion 55 and a lower tubular portion 56. The fit tubular portion 55 has a toroidal shape. The fit tubular portion 55 is fitted with the drain hole 30*b* of the bottom wall 30 of the intake box 20. The fit tubular portion 55 has an inlet 57 at an upper end of the fit tubular portion 55. The inlet 57 serves as an intake port for a conduit of the elastic drain nozzle 36, and faces the internal space 33. The inlet 57 of the elastic drain nozzle 36 is provided at a position lower than the inlet 52 of the introduction duct 35 in the internal space 33 of the intake box 20.

The lower tubular portion 56 protrudes downward from the fit tubular portion 55. The lower tubular portion 56 has a tapered portion 58 and a flat portion 59. The tapered portion 58 protrudes downward from the fit tubular portion 55. The flat portion 59 protrudes downward from the tapered portion 58. The flat portion 59 has a flat, elliptical cross-section. The tapered portion 58 has a horizontal cross-section that changes from a circular cross-section to a flat, elliptical cross-section in a direction from the lower tubular portion 56 toward the flat portion 59. The flat portion 59 has a slit outlet 59*a* at a lower end of the flat portion 59. The slit outlet 59*a* serves as an exhaust port for the conduit of the elastic drain nozzle 36, and faces the outside of the off-road vehicle 1.

When negative pressure is caused to occur at the intake port of the internal combustion engine EG, the negative pressure is transmitted to the internal space 33 of the intake box 20 through the first intake duct 21. Upon arrival of the negative pressure to the internal space 33, the flat portion 59 is elastically deformed to close the slit outlet 59*a* of the elastic drain nozzle 36. By closing the slit outlet 59*a*, water is prevented from entering the conduit of the elastic drain nozzle 36 from outside the intake box 20 and entering the internal space 33 of the intake box 20. When there is a low level of negative pressure in the internal space 33 of the intake box 20, the outlet 59*a* of the elastic drain nozzle 36 is open. When the outlet 59*a* is open, water accumulating on the bottom wall 30 of the intake box 20 passes through the conduit of the elastic drain nozzle 36 and is discharged to the outside.

Figure 16:
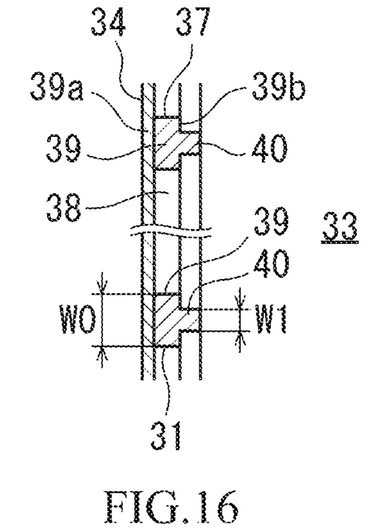
FIG. 16 is an enlarged cross-sectional view of a mesh wall of the intake box illustrated in FIG. 12.

FIG. 16 is an enlarged cross-sectional view of the first mesh wall 31 of the intake box 20 illustrated in FIG. 12. As illustrated in FIG. 16, at least one frame 37 of the frames 37 of the first mesh wall 31 includes a base 39 and a rib 40. In this embodiment, all the frames 37 of the first mesh wall 31 each include a base 39 and a rib 40. The base 39 has an outer surface 39*a* and an inner surface 39*b*. The outer surface 39*a* faces the outside of the intake box 20. The inner surface 39*b* faces the internal space 33 of the intake box 20. The rib 40 protrudes toward the internal space 33 from the inner surface 39*b* of the base 39. The rib 40 extends in the direction in which the frame 37 extends. The ribs 40 define a plurality of closed loops surrounding the plurality of first openings 38. The outer surface 39*a* of the base 39 has a width of W0, and the rib 40 of the base 39 has a width of W1. The outer surface 39*a* has such a flat surface that W0 is larger than W1. The filter 34 is in contact with the outer surface 39*a* of the base 39. The outer surface as a whole of the first mesh wall 31 which outer surface is located at the outer side in the width direction of the off-road vehicle 1 is a flat surface forming a single plane.

Due to the existence of the ribs 40, the first mesh wall 31 is difficult to elastically deform, even when intake-caused negative pressure acts on the first mesh wall 31. With this configuration, it is not necessary to diminish the first openings 38 of the first mesh wall 31 or diminish the first mesh wall 31 as a whole in order to prevent the first mesh wall 31 from being elastically deformed in the presence of negative pressure. As a result, intake performance is not degraded while the filter 34 is prevented from being removed off the first mesh wall 31, which includes the plurality of first openings 38.

In a cross-section orthogonal to the extending direction of the frame 37, the rib 40 protrudes from a center of the inner surface 39*b*, which faces the internal space 33. With this configuration, the rib 40 is difficult to visually recognize from outside the off-road vehicle 1, preventing the first mesh wall 31 from being disfigured from an appearance standpoint. At the same time, the strength throughout the first mesh wall 31 is increased in a well-balanced manner. The frames 41 of the second mesh wall 32 each include a base and a rib, similarly to the frames 37 of the first mesh wall 31. The second mesh wall 32, however, is identical in structure to the first mesh wall 31 and will not be elaborated upon here.

Figure 17:
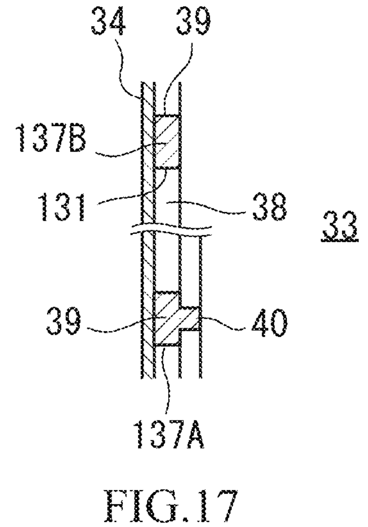
FIG. 17 is an enlarged cross-sectional view of a first modification of the mesh wall illustrated in FIG. 16.

FIG. 17 is an enlarged cross-sectional view of a first modification of the first mesh wall 31 illustrated in FIG. 16. A first mesh wall 131 according to the first modification includes frames 137. In the first modification, only some of the frames 137 include ribs 40. Each of the frames 137 includes a center frame 137A and an outer circumferential frame 137B. The center frame 137A is provided at a center of the first mesh wall 131. The outer circumferential frame 137B is provided at an outer circumference of the first mesh wall 131. The center frame 137A is a frame 137 provided in an area including a geometric center of the first mesh wall 131 as a whole, as viewed from a direction perpendicular to the outer surface 39*a* of the first mesh wall 131. The outer circumferential frame 137B is provided to surround the center frame 137A, as viewed from the direction perpendicular to the outer surface 39*a* of the first mesh wall 131.

The outer circumferential frame 137B is a frame 137 provided in an area further away from the geometric center of the first mesh wall 131 as a whole than the center frame 137A is away from the geometric center, as viewed from the direction perpendicular to the outer surface 39*a* of the first mesh wall 131. The outer circumferential frame 137B includes an outer circumference of a frame 137 farthest away from the geometric center of the first mesh wall 131 as a whole, as viewed from the direction perpendicular to the outer surface 39*a* of the first mesh wall 131.

In the first mesh wall 131, while the center frame 137A includes the base 39 and the rib 40, the outer circumferential frame 137B only includes the base 39, and does not include the rib 40. In this respect, a center portion of the first mesh wall 131 is elastically deformable most greatly. In the configuration in which the outer circumferential frame 137B only includes the base 39, the strength of the center portion of the first mesh wall 131 is increased. As a result, the first mesh wall 131 is effectively prevented from being elastically deformed in the presence of negative pressure. Also, since the outer circumferential frame 137B does not include the rib 40, the first mesh wall 131 is lighter in weight. It is to be noted that the second mesh wall 32 may be similar to the first mesh wall 131.

Figure 18:
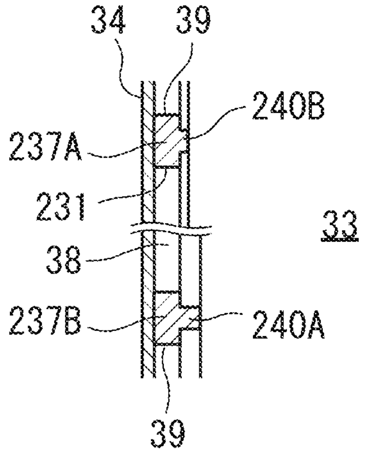
FIG. 18 is an enlarged cross-sectional view of a second modification of the mesh wall illustrated in FIG. 16.

FIG. 18 is an enlarged cross-sectional view of a second modification of the first mesh wall 31 illustrated in FIG. 16. As illustrated in FIG. 18, a first mesh wall 231 according to the second modification includes ribs 240. The ribs 240 vary in the amount of protrusion depending on where the ribs 240 are provided in the first mesh wall 231. In the first mesh wall 231, a center frame 237A includes a base 39 and a rib 240A, and an outer circumferential frame 237B includes a base 39 and a rib 240B. The amount of protrusion of the rib 240B of the outer circumferential frame 237B is smaller than the amount of protrusion of the rib 240A of the center frame 237A.

In this respect, a center portion of the first mesh wall 231 is elastically deformable most greatly. In the configuration in which the ribs 240 vary in the amount of protrusion, the strength of the center portion of the first mesh wall 231 is increased. As a result, the first mesh wall 231 is effectively prevented from being elastically deformed in the presence of negative pressure. Also, since the rib 240 of the outer circumferential frame 237B is smaller, the first mesh wall 231 is lighter in weight. It is to be noted that the second mesh wall 32 may be similar to the first mesh wall 231.

Figure 19:
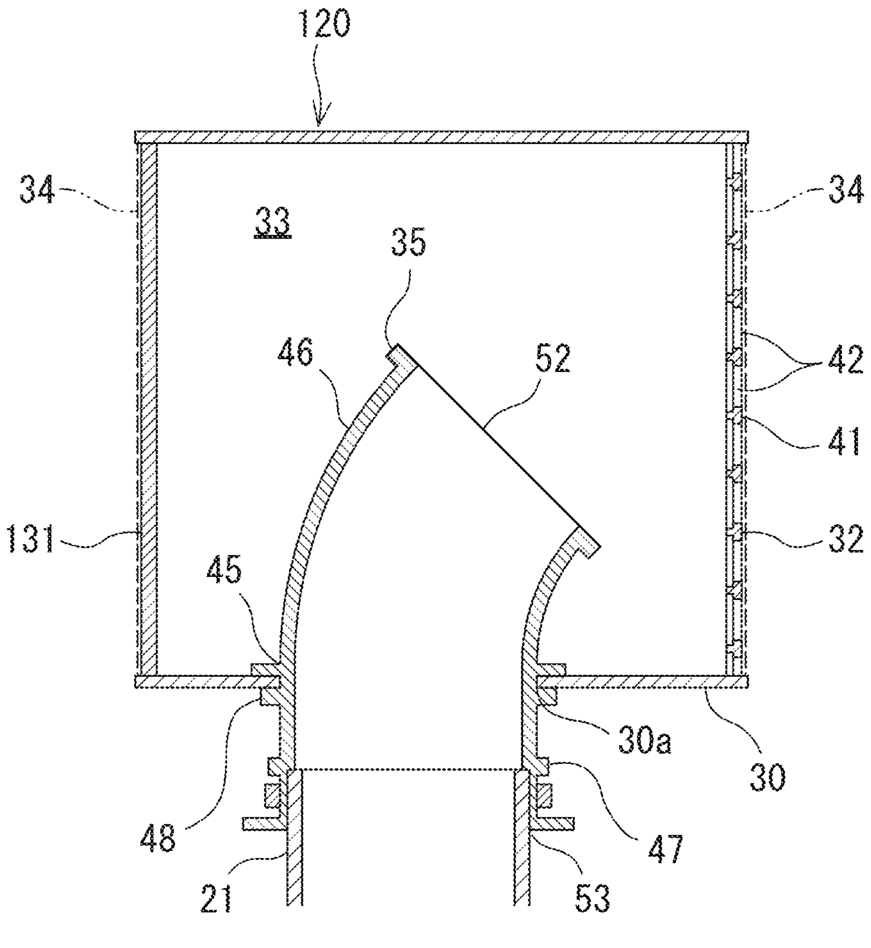
FIG. 19 is a cross-sectional view of a modification of the intake box illustrated in FIG. 13.

FIG. 19 is a cross-sectional view of an intake box 120. The intake box 120 is a modification of the intake box 20 illustrated in FIG. 13. It is to be noted that those elements and/or configurations common to the intake box 20 and the intake box 120 are designated by like or identical reference numerals, and will not be elaborated upon in the following description. As illustrated in FIG. 19, in the intake box 120 according to the modification, the right side wall 31 (which faces outward in the width direction of the off-road vehicle 1) is a nonporous (holeless) plate that closes the internal space 33 from outside in the width direction of the off-road vehicle 1. The left side wall 32 (which faces inward in the width direction of the off-road vehicle 1) is a mesh wall having the plurality of second openings 42. Through the second openings 42, the internal space 33 is exposed inward in the width direction of the off-road vehicle 1. The introduction duct 35 protrudes upward from the bottom wall 30 in a curved manner in a direction away from the right side wall 31 and toward the second openings 42. That is, the inlet 52 of the introduction duct 35 faces in a direction toward the second openings 42.

The internal space 33 of the intake box 120 is blocked by the right side wall 31 from the outside in the width direction of the off-road vehicle 1. This configuration makes it difficult for dust or water to enter the internal space 33. Also, the inlet 52 of the introduction duct 35 faces the second openings 42. This configuration ensures that once ambient air flows into the internal space 33 through the second openings 42, the ambient air is smoothly guided to the inside of the introduction duct 35 through the inlet 52. It is to be noted that the introduction duct 35 may protrude upward from the bottom wall 30 in a curved manner in a direction away from the second openings 42 and toward the right side wall 31. That is, the inlet 52 of the introduction duct 35 may face in a direction away from the second openings 42 and toward the right side wall 31.

Figure 20:
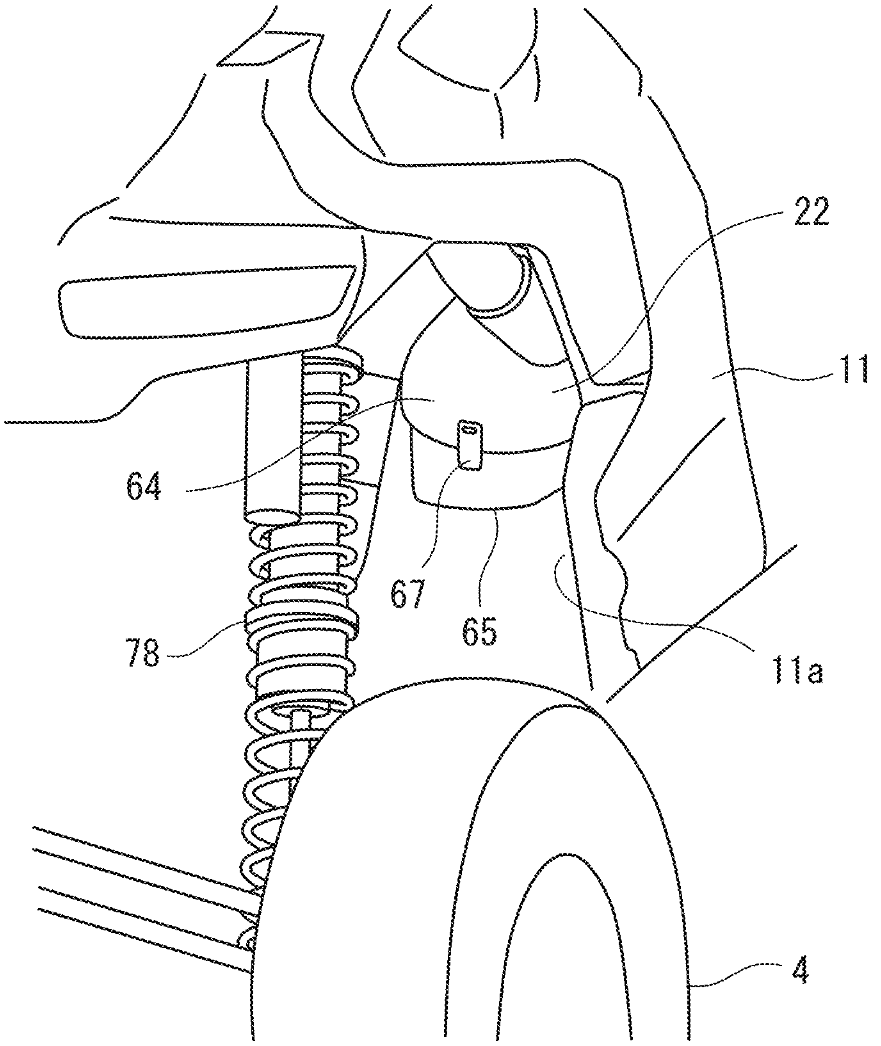
FIG. 20 is a diagonally right rear view of a right rear portion of the off-road vehicle illustrated in FIG. 1.

FIG. 20 is a diagonally right rear view of a right rear portion of the off-road vehicle 1 illustrated in FIG. 1. As illustrated in FIG. 20, the air cleaner 22, which is a part of the intake system 13, is covered by the side cowl 11 at an outer side of the air cleaner 22 in the width direction of the off-road vehicle 1, and is hidden in a side view of the off-road vehicle 1. The side cowl 11 includes the cutout portion 11*a*, through which the engine room ER is partially exposed outward in the width direction of the off-road vehicle 1. The air cleaner 22 includes a lid 65 and a lock 67. The lid 65 and the lock 67 are exposed in a diagonal rear view of the off-road vehicle 1. The lid 65 of the air cleaner 22 is visually recognized between the side cowl 11 and a rear suspension 78. This configuration makes the air cleaner 22 accessible for maintenance purposes while keeping the off-road vehicle 1 pleasing in appearance.

Figure 21:
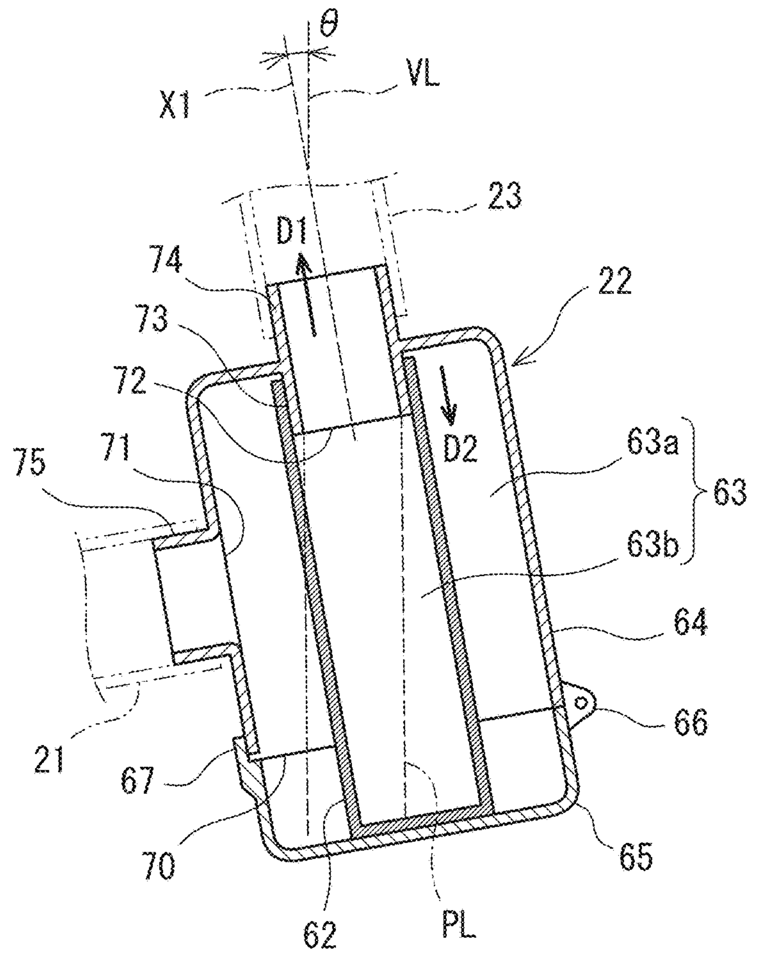
FIG. 21 is a longitudinal sectional view of an air cleaner illustrated in FIG. 4.

FIG. 21 is a longitudinal sectional view of the air cleaner 22 illustrated in FIG. 4. As illustrated in FIG. 21, the air cleaner 22 includes an air cleaner case 61 and an air cleaner element 62. The air cleaner element 62 includes a filter and is contained in the air cleaner case 61. The air cleaner case 61 has an internal space 63. The internal space 63 is divided into a dirty region 63*a* and a clean region 63*b* by the air cleaner element 62. Specifically, the dirty region 63*a* is provided at an upstream side of the air cleaner element 62 in the internal space 63, and the clean region 63*b* is provided at a downstream side of the air cleaner element 62 in the internal space 63.

The air cleaner case 61 has a round cylinder shape having an axis X1. The air cleaner case 61 includes a case body 64 and the lid 65. The case body 64 has an opening 70, an intake port 71, and an exhaust port 72. Through the opening 70, the internal space 63 is exposed downward. The opening 70 is shaped and sized to permit the air cleaner element 62 to pass through the opening 70. The intake port 71 faces the dirty region 63*a*. The exhaust port 72 faces the clean region 63*b* and communicates with a clean conduit of the second intake duct 23.

The lid 65 closes the opening 70 of the case body 64 in a manner in which the opening 70 is openable and closable from below. The lid 65 is attached to the case body 64 rotationally movably on a hinge 66. With the opening 70 of the case body 64 closed, the lid 65 is locked to the case body 64 by the lock 67. By releasing the lock 67 to open the lid 65, dust or water in the dirty region 63*a* falls through the opening 70 of the case body 64. This configuration prevents the dust or water from moving to the exhaust port 72 when the air cleaner element 62 is removed.

The axis X1 of the air cleaner case 61 is oriented substantially upward and has an angle of θ within a range of less than 45 degrees relative to a vertical line VL as viewed from the horizontal direction. The case body 64 has a cone shape having an inner diameter increasing in a downward direction of the case body 64. This configuration ensures that when dust or water attached to the air cleaner element 62 falls, it is less likely for the dust or water to attach to an inner circumferential surface of the case body 64.

The case body 64 includes an exhaust side inner tubular portion 73 and an exhaust side outer tubular portion 74. The exhaust side inner tubular portion 73 protrudes toward the internal space 63. The exhaust side outer tubular portion 74 communicates with the exhaust side inner tubular portion 73 and protrudes toward the outside coaxially with the exhaust side inner tubular portion 73. The exhaust side inner tubular portion 73 and the exhaust side outer tubular portion 74 are provided at an upper portion of the case body 64. The exhaust side outer tubular portion 74 defines a conduit communicating with the internal space 63, protrudes upward, and faces upward. The second intake duct 23 is connected to the exhaust side outer tubular portion 74. The exhaust side outer tubular portion 74 of the air cleaner case 61 and the inflow tubular portion 413 of the supercharger 24 face the same side in the vertical direction, i.e., face upward, the second intake duct 23 can be easily connected to the air cleaner 22 and the supercharger 24. The air cleaner 22 may include an inlet at an upper portion thereof and an outlet at a lower portion thereof.

The exhaust side inner tubular portion 73, at its protrusion end, defines the exhaust port 72. The exhaust port 72 has an axis identical to the axis X1 of the air cleaner case 61. The axis X1 of the exhaust port 72 extends in an exhaust direction D1 of the exhaust port 72. That is, the axis X1 of the exhaust port 72 extends in a protrusion direction D2 of the exhaust side inner tubular portion 73.

The air cleaner element 62 has a bottomed cylinder shape. The air cleaner element 62 is fitted with the exhaust side inner tubular portion 73 in a direction parallel to the protrusion direction D2 of the exhaust side inner tubular portion 73. The protrusion direction D2 of the exhaust side inner tubular portion 73 is opposite and parallel to the exhaust direction D1 of the exhaust port 72. Hence, the air cleaner element 62, which has a bottomed cylinder shape, is attached to the exhaust side inner tubular portion 73 in the exhaust direction D1 of the exhaust port 72. The exhaust side inner tubular portion 73 serves as an element support supporting the air cleaner element 62. By opening the lid 65, the air cleaner element 62 can be inserted into the case body 64 from below the case body 64 through the opening 70. When the air cleaner element 62 is inserted into the case body 64, the air cleaner element 62 can be easily supported by the case body 64.

The air cleaner element 62 supported by the exhaust side inner tubular portion 73 is provided radially inward in the case body 64 relative to the inner circumferential surface of the case body 64 so that there is a space between the air cleaner element 62 and the inner circumferential surface of the case body 64. This configuration ensures that when the air cleaner element 62 is attached and/or detached relative to the case body 64, the air cleaner element 62 is prevented from contacting the inner circumferential surface of the case body 64, and dust or water on the air cleaner element 62 is prevented from attaching to the inner circumferential surface of the case body 64.

The case body 64 includes an intake side outer tubular portion 75. The intake side outer tubular portion 75 protrudes toward the outside. The intake side outer tubular portion 75 is provided at a round-cylindrical circumferential wall of the case body 64. The first intake duct 21 is connected to the intake side outer tubular portion 75. The intake side outer tubular portion 75 defines the intake port 71, which faces the internal space 63. The exhaust port 72 is provided above the intake port 71. The exhaust port 72 is provided at an upper end portion of the air cleaner case 61. This configuration ensures that dust or water is more reliably prevented from entering the exhaust port 72 than when the exhaust port 72 of the air cleaner case 61 is provided at other than the upper end portion of the air cleaner case 61.

The air cleaner case 61 is provided to be oriented such that the exhaust port 72 is visually recognizable when the lid 65 is opened and the air cleaner element 62 is removed from the air cleaner case 61 and when the air cleaner case 61 is seen from vertically below the air cleaner case 61. A phantom line PL indicates a shape of the exhaust port 72 projected vertically downward. The phantom line PL passes through the opening 70. The exhaust direction D1 of the exhaust port 72 is oriented further upward than the horizontal direction. The exhaust direction D1 of the exhaust port 72 is oriented substantially upward and has an angle θ within a range of less than 45 degrees relative to the vertical line VL as viewed from the horizontal direction. This configuration of the intake port 71 ensures that dust or water scattering near the exhaust port 72 in the internal space 63 of the air cleaner case 61 moves downward under the dust or water's own weight. As a result, when the air cleaner element 62 is replaced, it is difficult for the dust or water to enter the exhaust port 72.

Figure 22:
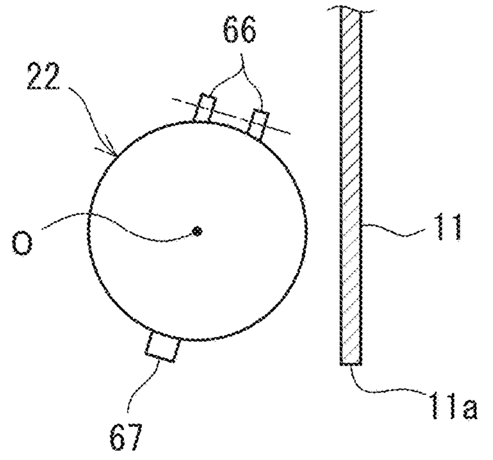
FIG. 22 is a top view of the air cleaner illustrated in FIG. 21 and a surrounding of the air cleaner.

FIG. 22 is a top view of the air cleaner 22 illustrated in FIG. 21 and a surrounding of the air cleaner 22. As illustrated in FIG. 22, the air cleaner 22 is covered by the side cowl 11 at the outer side of the air cleaner 22 in the vehicle width direction of the off-road vehicle 1 such that the air cleaner 22 and the side cowl 11 is next to each other. This configuration makes the air cleaner 22 more accessible for a user from outside in the width direction of the off-road vehicle 1 than when some other member is provided between the air cleaner 22 and the side cowl 11.

The hinge 66 of the air cleaner 22 is provided to be further away from the cutout portion 11*a* of the side cowl 11 than a center O of the air cleaner 22 is away from the cutout portion 11*a*. With this configuration, the lid 65 (see FIG. 21) is opened in a direction away from the cutout portion 11*a* of the side cowl 11, making the air cleaner element 62 easily replaceable through the cutout portion 11*a* of the side cowl 11. The lock 67 is provided to be closer to the cutout portion 11*a* than the center O of the air cleaner case 61 is to the cutout portion 11*a*. This configuration enables the user to easily open and close the lid 65 (see FIG. 21) through the cutout portion 11*a* of the side cowl 11.

Figure 23:
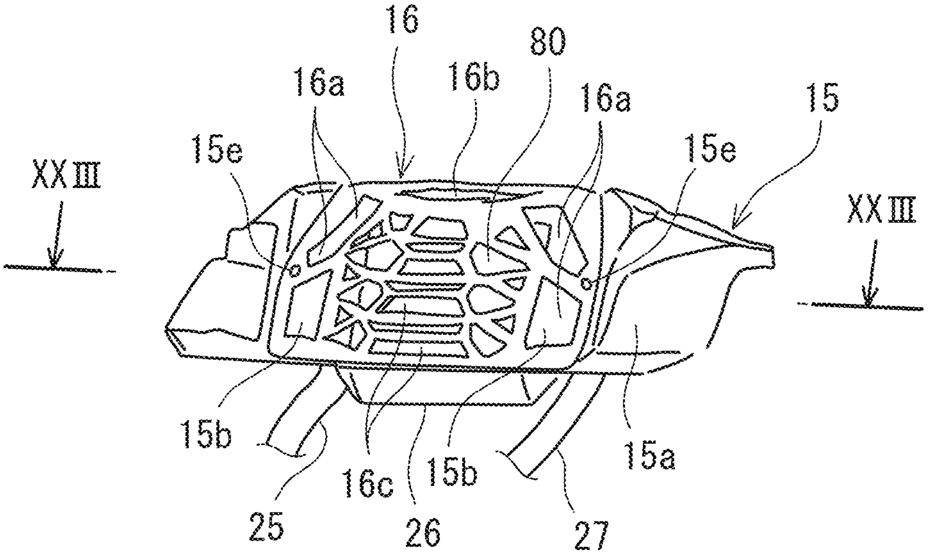
FIG. 23 is a diagonally left front view of an intercooler illustrated in FIG. 5 together with an engine room cover and a protection cover.
Figure 24:
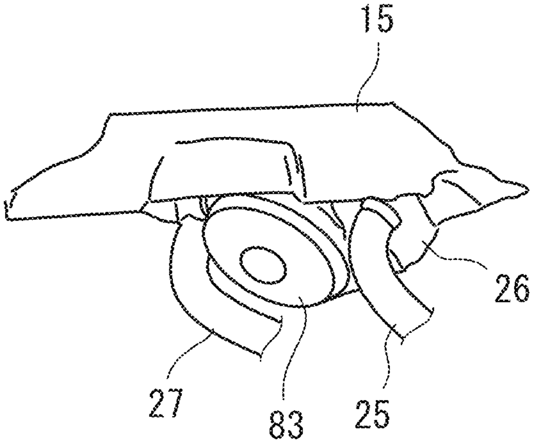
FIG. 24 is a diagonally right rear view of the intercooler and the engine room cover illustrated in FIG. 23.

FIG. 23 is a diagonally left front view of the intercooler 26 illustrated in FIG. 5 together with the engine room cover 15 and the protection cover 16. FIG. 24 is a diagonally right rear view of the intercooler 26 and the engine room cover 15 illustrated in FIG. 23. As illustrated in FIGS. 23 and 22, the engine room cover 15 defines an upper boundary of the engine room ER and partially covers the engine room ER, as described above by referring to FIG. 2. An upper surface 15*a* of the engine room cover 15 is exposed to outside the off-road vehicle 1. The upper surface 15*a* of the engine room cover 15 faces forward and upward. Specifically, a rear edge of the upper surface 15*a* of the engine room cover 15 is higher than a front edge of the upper surface 15*a* of the engine room cover 15.

The intercooler 26 includes the fan 83. The fan 83 is provided on a lower surface of the intercooler core 80. By driving the fan 83, air passes through the intercooler core 80 from the upper surface toward the lower surface of the intercooler core 80.

The engine room cover 15 is provided over the intercooler 26. The engine room cover 15 includes the window opening WD. Through the window opening WD, the intercooler core 80 is exposed to outside the off-road vehicle 1. The protection cover 16 is mounted on the engine room cover 15 to cover the window opening WD from above the window opening WD. The protection cover 16 has openings 16*a*. Each of the openings 16*a* is oriented in the width direction of the off-road vehicle 1. When ambient air flows into the space behind the cabin C (see FIG. 1) from the width direction of the off-road vehicle 1, the ambient air easily reaches the intercooler core 80 through the openings 16*a* of the protection cover 16.

The protection cover 16 has openings 16*a*, 16*b*, and 16*c*. The opening 16*b* is oriented rearward. The openings 16*c* and 16*a* are provided in front of the opening 16*b*. When air flows into the protection cover 16 and is subjected to heat exchange at the intercooler core 80, the resulting air is easily discharged outside through the rearward-oriented opening 16*b* of the protection cover 16. Thus, air is prevented from remaining in the protection cover 16, resulting in improved cooling performance of the intercooler 26. Specifically, the protection cover 16 is a mesh cover having a dome shape protruding upward. This configuration ensures that running air easily flows into the protection cover 16 and the air inside the protection cover 16 is easily discharged outside, resulting in improved cooling performance of the intercooler 26.

Figure 25:
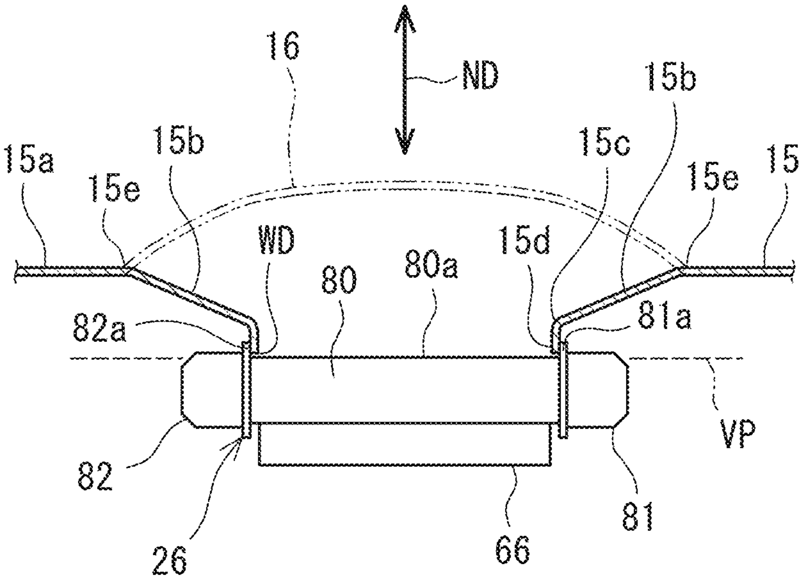
FIG. 25 is a cross-sectional view taken along a plane indicated by line XXIII-XXIII illustrated in FIG. 23.

FIG. 25 is a cross-sectional view taken along a plane indicated by line XXIII-XXIII illustrated in FIG. 23. As illustrated in FIG. 25, the engine room cover 15 includes a receiving portion 15*e*. The receiving portion 15*e* is provided at a distance from the window opening WD in the width direction of the off-road vehicle 1. The protection cover 16 is mounted on the receiving portion 15*e* of the engine room cover 15 using a securing tool. The openings 16*a* of the protection cover 16 are provided outside the intercooler core 80 in the width direction of the off-road vehicle 1. This configuration ensures that the air near the window opening WD of the engine room cover 15 in the width direction of the off-road vehicle 1 is easily guided to the intercooler core 80 without being blocked by the protection cover 16.

The window opening WD of the engine room cover 15 has a circumferential edge portion 15*c*. The circumferential edge portion 15*c* faces an upper surface of the intercooler 26 from above the upper surface, and is provided along an outer circumferential edge of the intercooler core 80. This configuration ensures that while the off-road vehicle 1 is running, air is guided along the upper surface 15*a* of the engine room cover 15 and is easily brought into contact with the entire intercooler core 80 through the window opening WD of the engine room cover 15.

The upper surface 15*a* of the engine room cover 15 has a pair of slope surfaces 15*b*. The pair of slope surfaces 15*b* are provided adjacent to the window opening WD at both sides of the window opening WD in the width direction of the off-road vehicle 1. The pair of slope surfaces 15*b* are inclined relative to a virtual plane VP. The virtual plane VP extends along an upper surface 80*a* of the intercooler core 80. Specifically, the pair of slope surfaces 15*b* become closer to the intercooler core 80 in a normal direction ND as the pair of slope surfaces 15*b* are provided more inward in the width direction of the off-road vehicle 1. The normal direction ND is perpendicular to the upper surface 80*a* of the intercooler core 80. When air flows along the upper surface 15*a* of the engine room cover 15 from the outside toward the inside in the width direction of the off-road vehicle 1, the air is easily brought into contact with the intercooler core 80 by being guided by the slope surfaces 15*b*. The receiving portion 15*e* of the engine room cover 15 is provided outward relative to the slope surfaces 15*b* in the width direction of the off-road vehicle 1. This configuration ensures that when running air passes inward through the protection cover 16, the air is easily brought into contact with the intercooler core 80 by being guided by the slope surfaces 15*b* of the engine room cover 15.

The engine room cover 15 covers the inlet tank 81 and the outlet tank 82 of the intercooler 26 from above the inlet tank 81 and the outlet tank 82. This configuration ensures that the flow of air along the upper surface 15*a* of the engine room cover 15 toward the intercooler core 80 is not disrupted by the inlet tank 81 and the outlet tank 82 of the intercooler 26.

The inlet tank 81 has an inner side surface 81*a*. The inner side surface 81*a* protrudes from one end of the upper surface 80*a* of the intercooler core 80 and extends in the normal direction ND. The normal direction ND is perpendicular to the upper surface 80*a* of the intercooler core 80. Similarly, the outlet tank 82 has an inner side surface 82*a*. The inner side surface 82*a* protrudes from the other end of the upper surface 80*a* of the intercooler core 80 and extends in the normal direction ND.

The circumferential edge portion 15*c* of the window opening WD of the engine room cover 15 has a protrusion 15*d*. The protrusion 15*d* protrudes toward the intercooler core 80 and extends along the inner side surfaces 81*a* and 82*a*. The protrusion 15*d* covers the inner side surface 81*a* of the inlet tank 81 and the inner side surface 82*a* of the outlet tank 82. This configuration ensures that when heat from the internal combustion engine EG reaches the gap between the engine room cover 15 and the inlet tank 81 and the outlet tank 82 of the intercooler 26, it is difficult for the heat to reach the intercooler core 80, preventing degradation of cooling performance of the intercooler 26.

Figure 26:
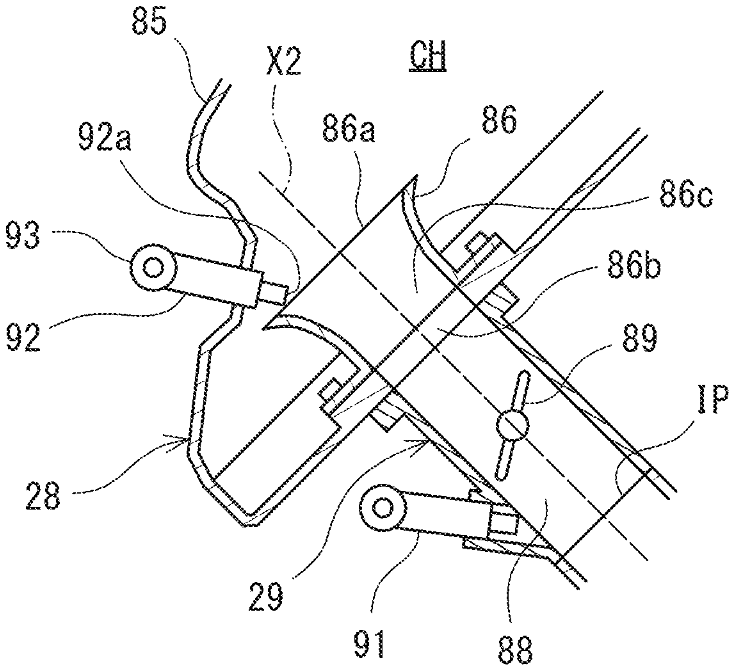
FIG. 26 is a longitudinal sectional view of an intake tank illustrated in FIG. 11 and a surrounding of the intake tank.
Figure 27:
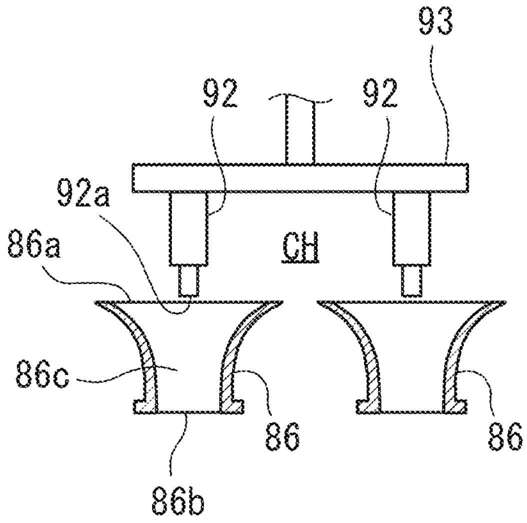
FIG. 27 is a top view and a partial cross-sectional view of air guides and second injectors provided in the intake tank illustrated in FIG. 11.

FIG. 26 is a longitudinal sectional view of the intake tank 28 illustrated in FIG. 11 and a surrounding of the intake tank 28. FIG. 27 is a top view and a partial cross-sectional view of air guides 86 and second injectors 92, which are provided in the intake tank 28 illustrated in FIG. 11. As illustrated in FIG. 26, the throttle body 29 is connected to the intake port IP of the internal combustion engine EG. The throttle body 29 includes a plurality of intake conduits 88 and a plurality of throttle valves 89. The plurality of intake conduits 88 are respectively connected to the intake ports IP of the plurality of cylinders of the internal combustion engine EG. The plurality of throttle valves 89 are each provided in each of the intake conduits 88. The throttle body 29 includes a plurality of first injectors 91. The plurality of first injectors 91 each inject fuel to a corresponding one of the plurality of intake conduits 88.

As illustrated in FIGS. 26 and 25, the intake tank 28 includes a plurality of air guides 86 in the intake chamber CH of the intake tank 28. Each air guide 86 guides the air in the intake chamber CH to the intake conduit 88 of the throttle body 29. The air guide 86 includes an intake port 86*a*, an exhaust port 86*b*, and a guide conduit 86*c*. The intake port 86*a* faces the intake chamber CH. The exhaust port 86*b* is connected to the intake conduit 88 of the throttle body 29. The exhaust port 86*b* of the air guide 86 also serves as an exhaust port of the intake tank 28. The guide conduit 86*c* connects the intake port 86*a* to the exhaust port 86*b*. The guide conduit 86*c* is tapered from narrow to wide toward the intake port 86*a*. With this configuration of the intake port 86*a*, the intake port 86*a* is larger than the exhaust port 86*b*.

The intake tank 28 includes a plurality of second injectors 92. The plurality of second injectors 92 inject fuel to the intake chamber CH. Each second injector 92 is supplied with fuel through a delivery pipe 93. The second injector 92 is provided for a corresponding one of the air guides 86. The fuel injected from the second injector 92 is vaporized to promote reduction of temperature of the air guided into the internal combustion engine EG.

In this embodiment, the throttle body 29 is used instead of an intake manifold. The throttle body 29 includes the throttle valves 89 respectively in the plurality of intake conduits 88. Using such throttle body 29 ensures that interference between the air being absorbed into the cylinders of the internal combustion engine EG is less likely to occur. The fuel injected from each second injector 92 is accurately guided to the corresponding intake conduit 88 of the throttle body 29. Then, the fuel is vaporized to generate a suitable amount of heat of vaporization for the corresponding cylinder of the internal combustion engine EG. This configuration reduces variation in intake temperature among the cylinders, ensuring that a knocking prevention effect is stable in each cylinder.

Each second injector 92 has an injection hole 92*a*. The injection hole 92*a* faces the intake port 86*a* of the air guide 86. This configuration ensures that the fuel injected from the second injector 92 is stably guided by the air guide 86 to the intake conduit 88 of the throttle body 29. The second injector 92 is provided to be away from an axis X2 of the intake port 86*a* of the air guide 86 in a direction orthogonal to the axis X2. This configuration keeps a smooth flow of intake air toward the intake port 86*a* of the air guide 86 in the intake chamber CH. The second injector 92 is inclined relative to the axis X2, and the injection hole 92*a* faces the axis X2 and a downstream of the guide conduit 86*c* of the air guide 86. This configuration ensures that the fuel from the second injector 92 is appropriately dispersed to the intake air in the guide conduit 86*c* of the air guide 86.

Figure 28:
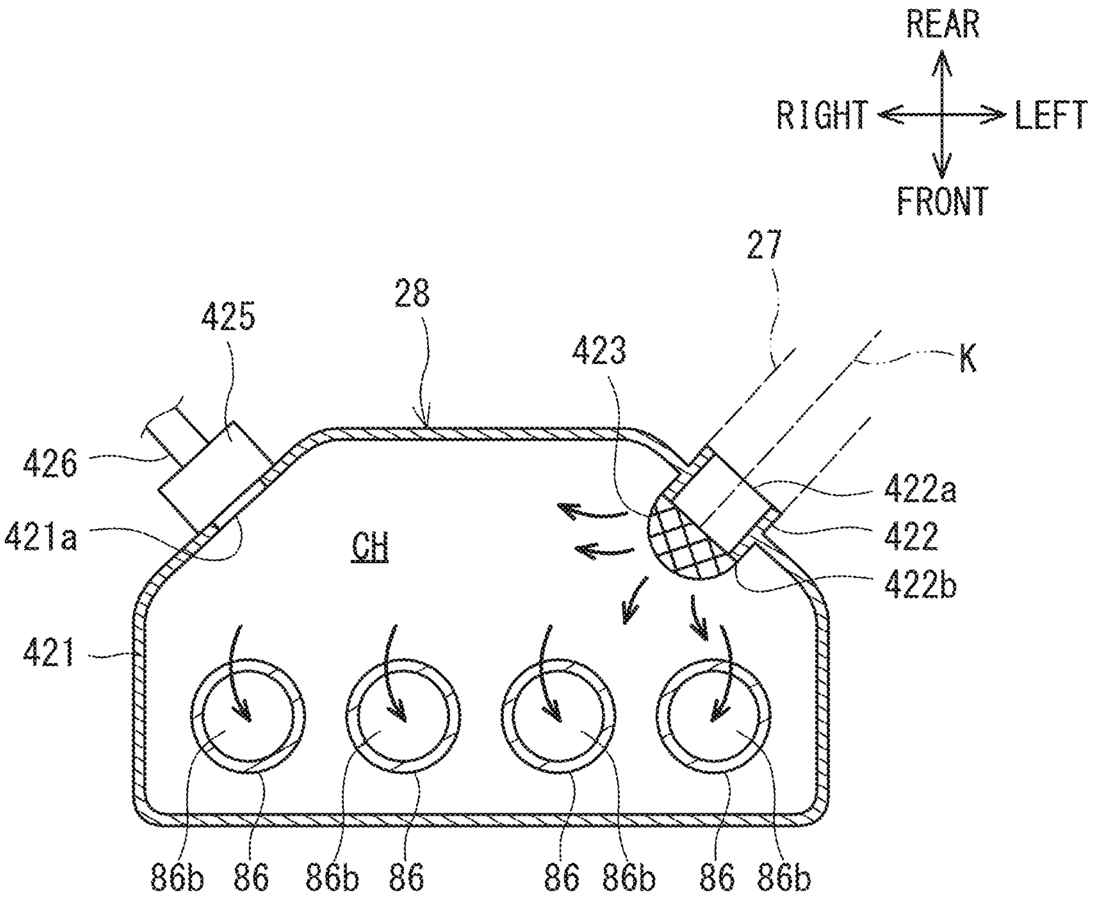
FIG. 28 is a cross-sectional view of the intake tank illustrated in FIG. 11.

FIG. 28 is a cross-sectional view of the intake tank 28 illustrated in FIG. 11. As illustrated in FIG. 28, the intake tank 28 includes a tank portion 421 that defines the intake chamber CH. The air guides 86 are lined up in the right-left direction at the tank portion 421, and the number of air guides 86 is equal to the number of cylinders of the internal combustion engine EG. The outflow ports 86*b* of the air guides 86 respectively communicate with the intake conduits 88 (see FIG. 26) of the throttle body 29. The intake tank 28 includes the inflow tubular portion 422 that protrudes from the tank portion 421. The inflow tubular portion 422 is located at one side of the tank portion 421 in the right-left direction and one side of the tank portion 421 in the front-rear direction. Specifically, the inflow tubular portion 422 is located at a rear-left portion of the tank portion 421. The fourth intake duct 27 is connected to the inflow tubular portion 422.

The inflow tubular portion 422 includes an inflow port 422*a* and a discharge port 422*b*. The air from the fourth intake duct 27 flows into the inflow port 422*a*, and the inflow port 422*a* communicates with the intake chamber CH. The discharge port 422*b* discharges the air to the intake chamber CH. The inflow tubular portion 422 is located at one side of the tank portion 421 in the right-left direction. An axis K of the discharge port 422*b* of the inflow tubular portion 422 is inclined relative to the right-left direction and front-rear direction of the tank portion 421. The discharge port 422*b* faces in a direction from one side of the tank portion 421 in the right-left direction and one side of the tank portion 421 in the front-rear direction to the other side of the tank portion 421 in the right-left direction and the other side of the tank portion 421 in the front-rear direction. Specifically, the discharge port 422*b* faces in a front-right direction. The outlet of the intercooler 26 is located behind the intake tank 28. The discharge port 422*b* is located at a rear portion of the intake tank 28 and faces downward. Thus, the length of the fourth intake duct 27 can be reduced.

The intake tank 28 includes a diffuser 423 located between the discharge port 422*b* and the intake chamber CH. The diffuser 423 diffuses the air, which has flowed from the inflow port 422*a* into the inflow tubular portion 422 and is to be discharged from the discharge port 422*b* into the intake chamber CH, into the intake chamber CH. The diffuser 423 includes a net having a dome shape projecting toward the intake chamber CH. The diffuser 423 diffuses the air into the intake chamber CH. Thus, the deviation of the flow speed of the intake air in the intake chamber CH is suppressed, and the intake air is guided to the cylinders of the internal combustion engine EG in a balanced manner. The diffuser 423 is not limited to this. The diffuser 423 may be able to widely spread the air, discharged from the discharge port 422*b*, into the intake chamber CH, and for example, may be a porous plate having a curved shape that projects toward the intake chamber CH.

The tank portion 421 includes an outflow port 421*a* located at the other side in the right-left direction. Specifically, the outflow port 421*a* is located at a rear-right portion of the tank portion 421. The relief valve 425 communicating with the outflow port 421*a* is attached to an outer surface of the tank portion 421. When the pressure in the intake chamber CH exceeds a predetermined limit value, the relief valve 425 opens to release the air in the intake chamber CH to an outside of the intake tank 28.

The return tube 426 is connected to a discharge port of the relief valve 425. The return tube 426 is connected to the buffer tank 412 of the supercharger 24 (see FIG. 8). The return tube 426 makes the discharge port of the relief valve 425 communicate with the pressurizing space S1 (see FIG. 10) of the supercharger 24. In the present embodiment, the return tube 426 is connected to an upper portion of the buffer tank 412. When the relief valve 425 opens, the pressure in the intake chamber CH is released to the buffer tank 412 of the supercharger 24 through the return tube 426. To be specific, the air flowing from the relief valve 425 to the return tube 426 flows into the buffer space S2 (see FIG. 10) of the supercharger 24. By the relief valve 425 and the return tube 426, the intake tank 28 is protected, and intake pressure in the intake tank 28 is effectively utilized. The discharge port of the relief valve 425 is located at a portion of the intake tank 28 which is located at a right side of a center of the intake tank 28 in the width direction of the off-road vehicle 1. The discharge port of the relief valve 425 faces rightward. Thus, the length of the return tube 426 can be reduced. The return tube 426 can be reduced in length by connecting the return tube 426 to a right portion of the intake tank 28.

As illustrated in FIGS. 8 and 7, the relief valve 425 is located at a portion of the intake tank 28 which is closer to the supercharger 24 than the inflow tubular portion 422 is. Thus, the return tube 426 can be reduced in length, and the occupied space of the return tube 426 is reduced.

Figure 29:
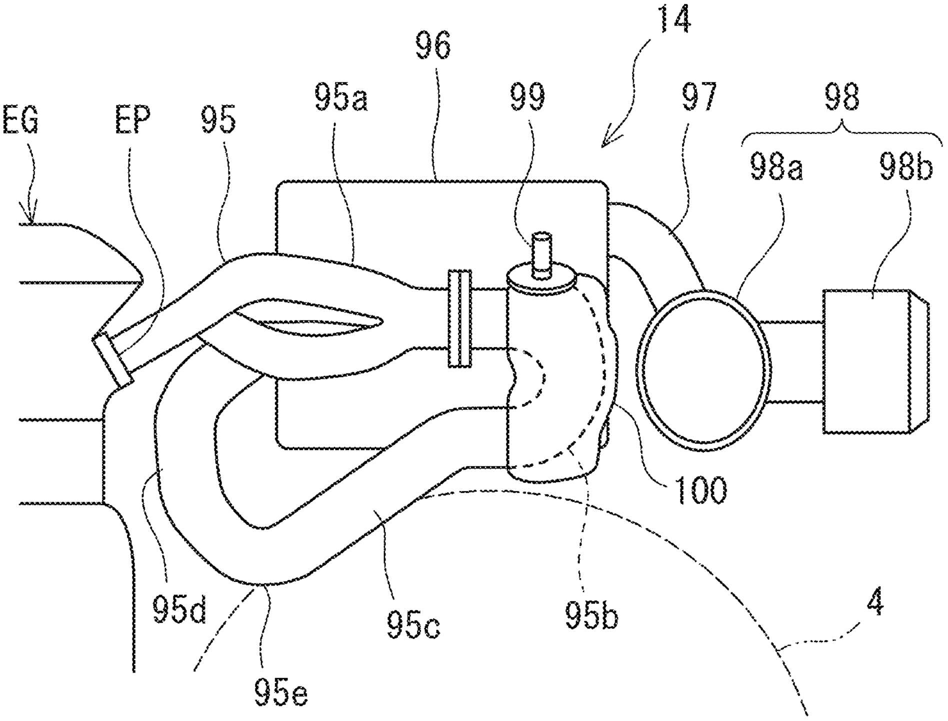
FIG. 29 is a left side view of the exhaust system of the off-road vehicle illustrated in FIG. 1.
Figure 30:
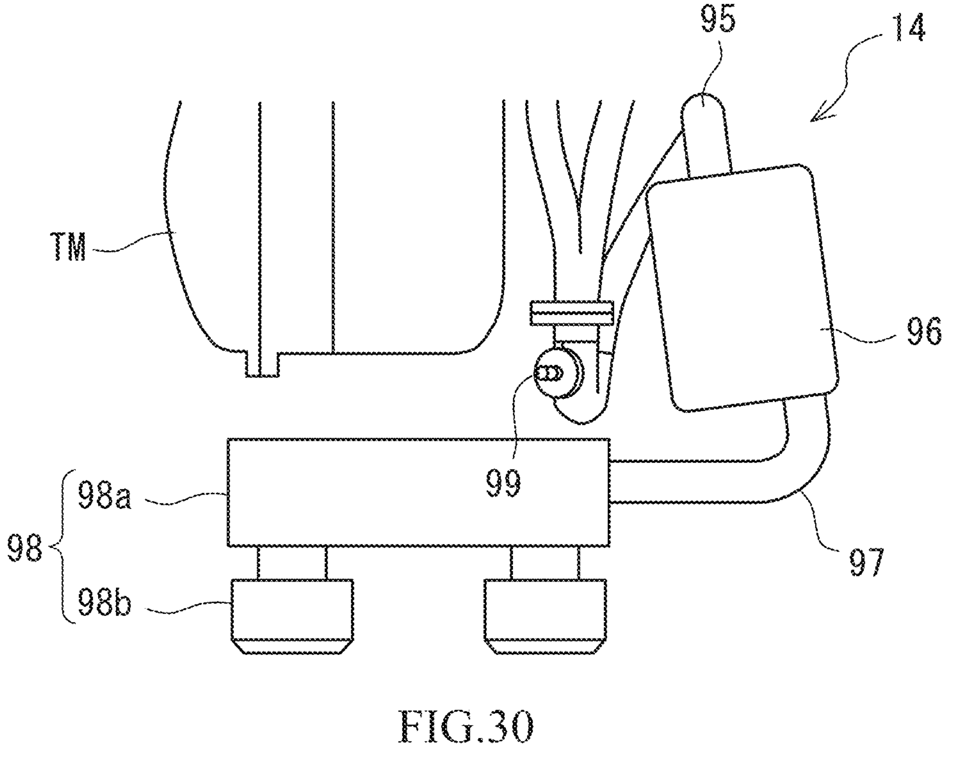
FIG. 30 is a top view of the exhaust system illustrated in FIG. 29.

FIG. 29 is a left side view of the exhaust system 14 of the off-road vehicle 1 illustrated in FIG. 1. FIG. 30 is a top view of the exhaust system 14 illustrated in FIG. 29. As illustrated in FIGS. 29 and 28, the exhaust system 14 includes the first exhaust pipe 95, the first muffler 96, the second exhaust pipe 97, and the second muffler 98. The first muffler 96 and the second muffler 98 are provided in a space under the cargo bed 10 (see FIG. 2). The first exhaust pipe 95 is connected to an exhaust port EP of the internal combustion engine EG. The first exhaust pipe 95 is curved in a vertical direction.

Specifically, the first exhaust pipe 95 includes a manifold 95*a*, a first curved portion 95*b*, a return portion 95*c*, and a second curved portion 95*d*. The manifold 95*a* has upstream end portions respectively connected to a plurality of exhaust ports EP of the internal combustion engine EG. The upstream end portions meet at a downstream end portion of the manifold 95*a*. The first curved portion 95*b* is curved in a U shape such that an upstream end portion and a downstream end portion of the first curved portion 95*b* are oriented in a front direction of the off-road vehicle 1 in a side view of the off-road vehicle 1. The first curved portion 95*b* is curved downward from the upstream side toward the downstream side. The upstream end portion of the first curved portion 95*b* is connected to the manifold 95*a*, and the downstream end portion of the first curved portion 95*b* is connected to the return portion 95*c*. The return portion 95*c* extends in the front direction of the off-road vehicle 1. The second curved portion 95*d* is curved in a U shape such that an upstream end portion and a downstream end portion are oriented in the front direction of the off-road vehicle 1 in a side view of the off-road vehicle 1. The second curved portion 95*d* is curved upward from the upstream side toward the downstream side. The upstream end portion of the second curved portion 95*d* is connected to the return portion 95*c*, and the downstream end portion of the second curved portion 95*d* is connected to an inlet of the first muffler 96.

The exhaust gas discharged through the exhaust port EP of the internal combustion engine EG takes a steep turn at the first curved portion 95*b* of the first exhaust pipe 95, making the first curved portion 95*b* likely to increase in temperature. In view of this, the first curved portion 95*b* is covered by a tube cover 100. An example of the tube cover 100 is a metal plate. A space is defined between an inner surface of the tube cover 100 and an outer surface of the first exhaust pipe 95. This configuration reduces the amount of heat transmitted from the first curved portion 95*b* of the first exhaust pipe 95 to its surroundings.

The first muffler 96 is connected to the first exhaust pipe 95 and the second exhaust pipe 97. The second muffler 98 is connected to the second exhaust pipe 97. With this configuration, the exhaust gas discharged through the exhaust port EP of the internal combustion engine EG flows through the first exhaust pipe 95, the first muffler 96, the second exhaust pipe 97, and the second muffler 98, in this order. Then, the exhaust gas is discharged outside the off-road vehicle 1 from the second muffler 98. Thus, exhaust noise is reduced stepwise by the first muffler 96 and the second muffler 98. Specifically, exhaust noise is attenuated appropriately to comply with noise regulations.

The first muffler 96 and the second muffler 98 are spaced apart from each other in the width direction of the off-road vehicle 1. The first muffler 96 is exposed outward in the width direction of the off-road vehicle 1 in a side view of the off-road vehicle 1. The second muffler 98 is provided behind the first muffler 96. The first muffler 96 extends in the front-rear direction of the off-road vehicle 1, and the second muffler 98 extends in the width direction of the off-road vehicle 1. This configuration increases the degree of freedom of component design and component layout in the space under the cargo bed 10 of the off-road vehicle 1. The above configuration also ensures that the first muffler 96 is cooled by air flowing in the front-rear direction of the off-road vehicle 1, preventing the heat of the first muffler 96 from being transmitted to the second muffler 98.

The first muffler 96 and the second muffler 98 are provided at positions higher than the rear wheels 4. This configuration ensures that the ground's muddy water splashing from the rear wheels 4 is less likely to hit the first muffler 96 and the second muffler 98. The first muffler 96 has a height range measured from an upper end to a lower end of the first muffler 96. Similarly, the second muffler 98 has a height range measured from an upper end to a lower end of the second muffler 98. These height ranges overlap. This configuration minimizes the height range occupied by the first muffler 96 and the second muffler 98 as a whole.

An oxygen sensor 99 is mounted on the first exhaust pipe 95. The oxygen sensor 99 includes a detection part exposed to a conduit of the first exhaust pipe 95 to detect oxygen concentration of the exhaust gas from the internal combustion engine EG. The oxygen sensor 99 is provided further upstream than a lowermost portion 95*e* of the first exhaust pipe 95. Specifically, the oxygen sensor 99 is mounted on an upper portion of the first curved portion 95*b* (the upper portion is an upstream portion of the first curved portion 95*b*), and protrudes upward from the first exhaust pipe 95. There may be a case where the lowermost portion 95*e* of the first exhaust pipe 95 touches water, causing the moisture included in the exhaust gas to be liquefied into water. In this case, the resulting water flows toward further downstream than the lowermost portion 95*e* of the first exhaust pipe 95, as if to be away from the oxygen sensor 99. This configuration ensures that when the moisture included in the exhaust gas is liquefied into water, the resulting water is prevented from attaching to the oxygen sensor 99. As a result, the oxygen sensor 99 is prevented from being shortened in lifetime.

The continuously variable transmission TM is provided to the left of the internal combustion engine EG. The first muffler 96 is provided to the right of the internal combustion engine EG. This configuration ensures that the heat passing through the passage defined by the first exhaust pipe 95, the first muffler 96, and the second exhaust pipe 97 is prevented from being transmitted to the continuously variable transmission TM. As a result, a lower level of heat resistance is required of the continuously variable transmission TM.

The first muffler 96 has a capacity larger than the capacity of the second muffler 98. The first muffler 96 is provided further upstream than the second muffler 98, and is larger in capacity than the second muffler 98. While such first muffler 96 tends to have high temperatures, the first muffler 96 is cooled by running air flowing on both sides of the off-road vehicle 1 while the off-road vehicle 1 is running. The second muffler 98 is provided further inward than the first muffler 96 in the width direction of the off-road vehicle 1. Since, however, the second muffler 98 has a smaller capacity, the second muffler 98 is prevented from having an excessively large heat influence on surrounding components.

The second muffler 98 is provided behind the first exhaust pipe 95 and the first muffler 96. The second muffler 98 includes a muffler body 98*a* and a pair of muffler nozzles 98*b*. The muffler body 98*a* is connected to the second exhaust pipe 97 and extends in the width direction of the off-road vehicle 1. The pair of muffler nozzles 98*b* protrude rearward from the muffler body 98*a*. The pair of muffler nozzles 98*b* are spaced apart from each other in the width direction of the off-road vehicle 1.

Figure 31:
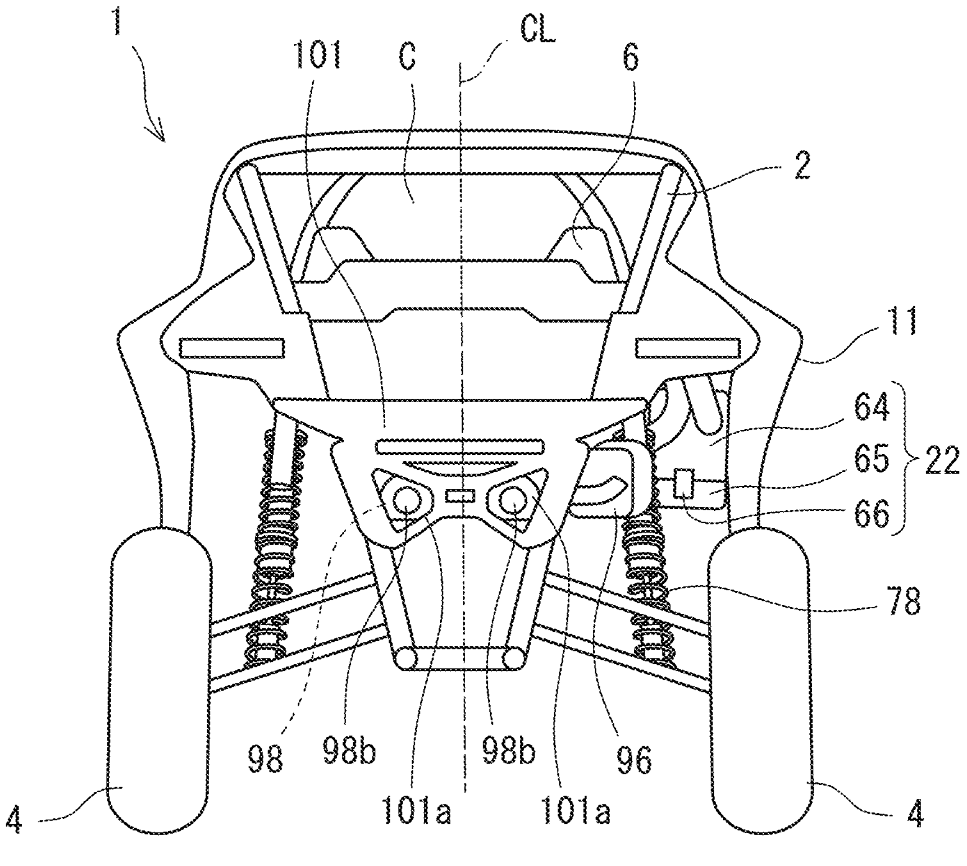
FIG. 31 is a rear side view of the off-road vehicle illustrated in FIG. 1.

FIG. 31 is a rear side view of the off-road vehicle 1 illustrated in FIG. 1. As illustrated in FIG. 31, the first muffler 96 and the second muffler 98 are exposed in the rear side view of the off-road vehicle 1. In particular, the second muffler 98 is provided behind the first muffler 96, and is exposed in the rear side view of the off-road vehicle 1. This configuration enables the second muffler 98 to smoothly discharge heat rearward while the off-road vehicle 1 is running. In other words, the first muffler 96 and the second muffler 98 are cooled in a well-balanced manner.

The muffler body 98*a* of the second muffler 98 is covered by a rear cowl 101 from behind the muffler body 98*a*. The rear cowl 101 has a pair of openings 101*a*. The pair of openings 101*a* are aligned in the width direction of the off-road vehicle 1. The muffler nozzles 98*b* are respectively provided at the openings 101*a* in the rear side view of the off-road vehicle 1. A phantom vehicle center line CL extends in the vertical direction. In the rear side view of the off-road vehicle 1, the phantom vehicle center line CL is provided between the pair of muffler nozzles 98*b*, which are aligned in the width direction of the off-road vehicle 1. The pair of muffler nozzles 98*b* are provided to be bilaterally symmetric with respect to the phantom vehicle center line CL. The pair of openings 101*a* of the rear cowl 101 are bilaterally symmetric with respect to the phantom vehicle center line CL. This configuration makes the off-road vehicle 1 pleasing in appearance in its rear side view. The lid 65 of the air cleaner 22 is also exposed in the rear side view of the off-road vehicle 1. This configuration makes the lid 65 of the air cleaner 22 more accessible.

Figure 32:
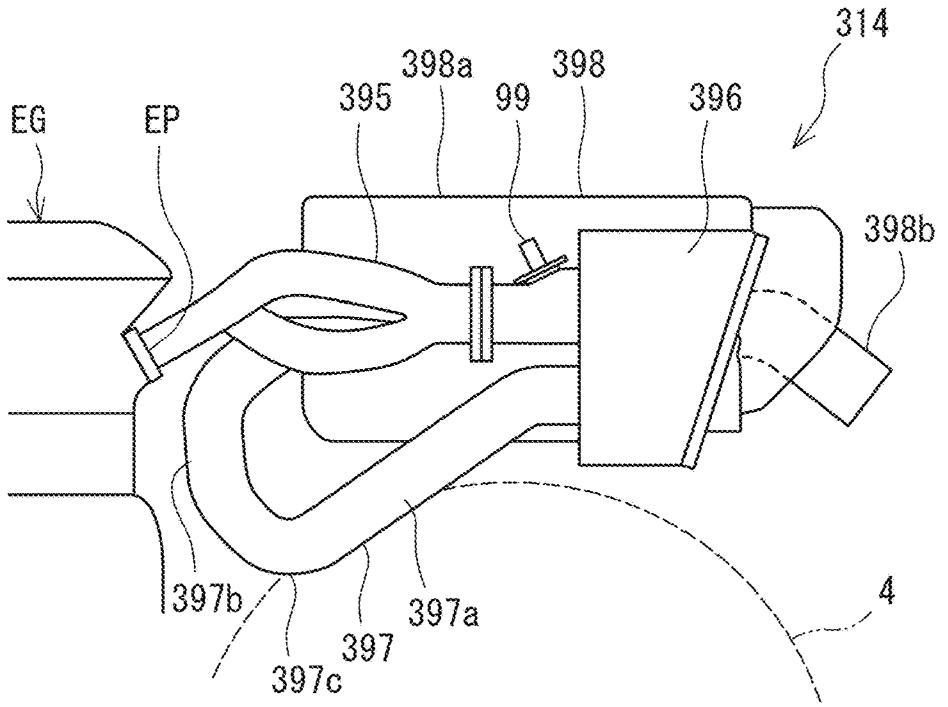
FIG. 32 is a left side view of a modification of the exhaust system illustrated in FIG. 29.
Figure 33:
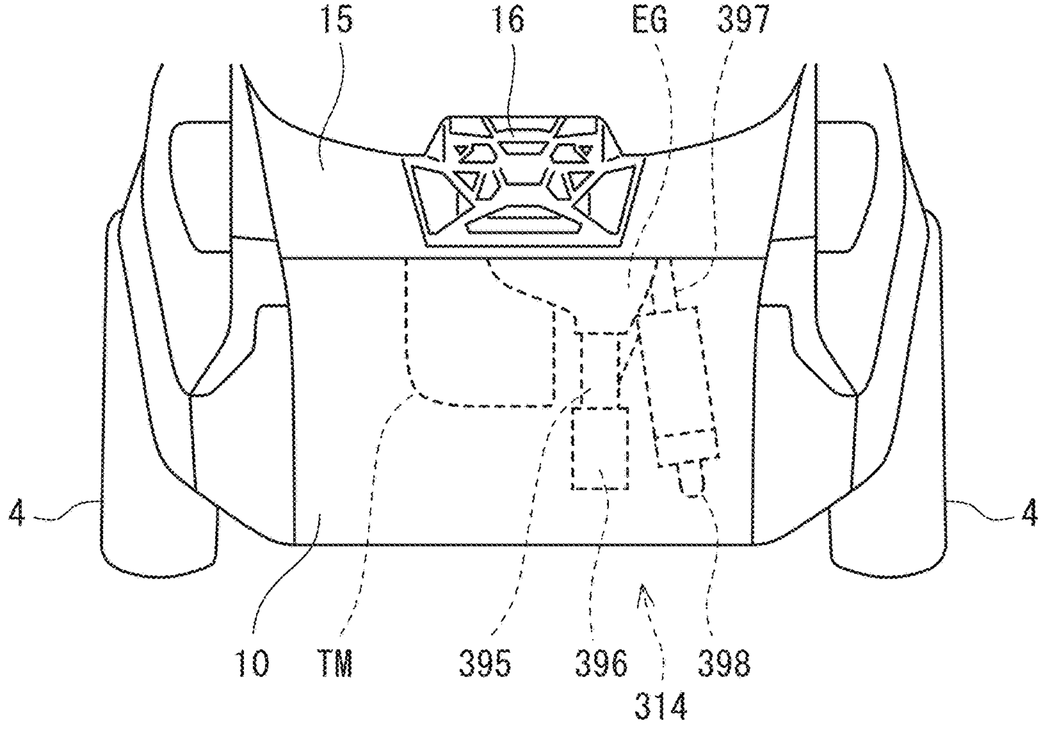
FIG. 33 is a top view of the rear portion of the off-road vehicle including the exhaust system illustrated in FIG. 32.

FIG. 32 is a left side view of a modification of the exhaust system 14 illustrated in FIG. 29. FIG. 33 is a top view of the rear portion of the off-road vehicle 1 including an exhaust system 314 illustrated in FIG. 32. As illustrated in FIGS. 32 and 31, the exhaust system 314 according to this modification includes a first exhaust pipe 395, a first muffler 396, a second exhaust pipe 397, and a second muffler 398. The first muffler 396 and the second muffler 398 are provided in the space under the cargo bed 10. The first exhaust pipe 395 is connected to the exhaust port EP of the internal combustion engine EG. The first exhaust pipe 395 is curved in the vertical direction.

Specifically, the first exhaust pipe 395 has upstream end portions respectively connected to the plurality of exhaust ports EP of the internal combustion engine EG. The upstream end portions meet at a downstream end portion of the first exhaust pipe 395. The first exhaust pipe 395 is connected to the first muffler 396. The first muffler 396 extends in the vertical direction. The first exhaust pipe 395 is connected to an upper portion of the front side of the first muffler 396. The second exhaust pipe 397 extends frontward from a lower portion of the first muffler 396. A front portion of the second exhaust pipe 397 is curved upward from the upstream side toward the downstream side. The second exhaust pipe 397 is connected to the second muffler 398. The second muffler 398 includes a muffler body 398*a* and a muffler nozzle 398*b*. To the muffler body 398*a*, the second exhaust pipe 397 is connected. The muffler nozzle 398*b* protrudes rearward from the muffler body 398*a*.

The second muffler 398 has a capacity larger than the capacity of the first muffler 396. The second muffler 398 is provided further outward than the first muffler 396 in the width direction of the off-road vehicle 1. The second muffler 398 is exposed outward in the width direction of the off-road vehicle 1. The first muffler 396 and the second muffler 398 are provided at positions higher than the rear wheels 4. The first muffler 396 and the second muffler 398 overlap in a side view of the off-road vehicle 1. That is, the height range of the first muffler 396 from its upper end to lower end overlaps with the height range of the second muffler 398 from its upper end to lower end.

The oxygen sensor 99 is mounted on the first exhaust pipe 395. The oxygen sensor 99 is provided further upstream than a lowermost portion 397*c* of the second exhaust pipe 397, that is, the lowermost portion 397*c* of the exhaust system 314. Specifically, the oxygen sensor 99 is mounted on an upper portion of the first exhaust pipe 395 and protrudes upward from the first exhaust pipe 395.

It will be appreciated that the present disclosure will not be limited to the above-described embodiment. For example, the introduction duct 35 of the intake box 20 may not necessarily be a piece separate from the intake box 20; the bottom wall 30 of the intake box 20 and the introduction duct 35 may be a one-piece element. The openings 38 and 42 of the mesh walls 31 and 32 of the intake box 20 may not necessarily be hexagonal in shape but may be round in shape, for example.

The intake box 20 and the air cleaner 22 may be used for the intake air guided to the inside of the continuously variable transmission TM for cooling purposes. In the air cleaner 22, the lid 65 may not necessarily be connected to the case body 64 by the hinge 66. That is, the lid 65 may be completely removable from the case body 64. The lid 65 of the air cleaner 22 may have drain holes through which water is discharged. The opening 70 of the case body 64 of the air cleaner 22 may be arranged to expose the internal space 63 substantially in the horizontal direction. The lid 65 of the air cleaner 22 may close the opening 70 of the case body 64 substantially in the horizontal direction. The opening 70 of the case body 64 may be shaped and sized to permit the air cleaner element 62 moving in the horizontal direction to pass through the opening 70. In this case as well, the lid 65 of the air cleaner 22 may be visually recognizably provided between the side cowl 11 and the rear suspension 78 such that the lid 65 is exposed in a diagonal rear view of the off-road vehicle 1.

The air cleaner 22 may be covered by a cowl other than the side cowl 11. The supercharger 24 may be an electric supercharger driven by an electric motor. The supercharger 24, however, will not be limited to a mechanical supercharger but may be a turbocharger driven by an exhaust turbine. The off-road vehicle 1 may not necessarily be equipped with the supercharger 24. In this case, the intake supplied element connected to the second intake duct 23 may be the intake tank 28 or the internal combustion engine EG. While the plurality of air guides 86 are structures separate from each other, the plurality of air guides 86 may be an integrally molded one-piece element.

While the present disclosure has been described in connection with embodiments, it will be understood that the above-described embodiments will not be intended in a limiting sense and that omissions, substitutions, additions, and/or alterations may be made to the embodiments. It will also be understood that the components and/or configurations described in the embodiments may be combined to form a new embodiment. For example, one or some of the configurations described in the embodiments may be isolated from the rest of the configurations in any manner deemed suitable. It will further be understood that the components and/or configurations described in the accompanying drawings and detailed description not only include those components and/or configurations essential for problem solving purposes but also include those components and/or configurations inessential for problem solving purposes.

The crank shaft 401 may extend in the front-rear direction of the off-road vehicle 1. In the case of using the internal combustion engine EG including a large number of cylinders, the increase in size of the occupied space of the internal combustion engine EG in the width direction of the off-road vehicle 1 is prevented by the crank shaft 401 extending in the front-rear direction. In this case, the impeller housing 410 of the supercharger 24 may be located behind the internal combustion engine EG. The off-road vehicle 1 does not have to include a rear seat. The off-road vehicle 1 may include a cabin structure that separates the cabin C and an external space. The off-road vehicle 1 may include a roof. The off-road vehicle 1 may be a 4WD vehicle in which the front wheels 3 and the rear wheels 4 are driving wheels, a 2WD vehicle in which only the rear wheels 4 are the driving wheels, or a vehicle that can switch between 4WD and 2WD. The off-road vehicle 1 may be a hybrid vehicle. Instead of the continuously variable transmission TM, a gear transmission may be used. At least one of the intake box 20 or the intake tank 28 may be omitted. The intercooler 26 may be omitted. The throttle body 29 may be located upstream of the intake tank 28. The off-road vehicle 1 may include only one muffler instead of two mufflers 96 and 98.

What is claimed is:

1. An off-road vehicle comprising:
a supercharger including
a pressurization rotating body,
an accommodating portion that defines a pressurizing space accommodating the pressurization rotating body, and
an outflow tubular portion including an outflow port communicating with the pressurizing space, the outflow port facing upward;
an intercooler located above the accommodating portion, the intercooler including
an intercooler core; and
an inlet tank that includes an inlet tubular portion and is adjacent to one side of the intercooler core in a width direction, the inlet tubular portion facing downward; and
an upstream intake duct connecting the outflow tubular portion of the supercharger to the inlet tank of the intercooler, wherein:
one side of a vertical center line, which passes through a width-direction center of the intercooler and extends in a vertical direction, in the width direction is referred to as a first side, and the other side of the vertical center line in the width direction is referred to as a second side,
the outflow tubular portion of the supercharger, the inlet tubular portion of the intercooler, and the upstream intake duct are located at the first side of the vertical center line, and
the outflow tubular portion, the inlet tubular portion and the upstream intake duct extend in the vertical direction.

2. The off-road vehicle according to claim 1, further comprising:
a downstream intake duct; and
an intake tank including:
a tank portion that defines an intake chamber and
an inflow tubular portion that protrudes from the tank portion and includes an inflow port communicating with the intake chamber,
wherein:
the intercooler further includes an outlet tank that includes an outlet tubular portion and is adjacent to the other side of the intercooler core in the width direction;
the downstream intake duct connects the outlet tubular portion of the outlet tank of the intercooler to the inflow tubular portion of the intake tank; and
the outlet tubular portion of the intercooler, the inflow tubular portion of the intake tank, and the downstream intake duct are located at the second side of the vertical center line.

3. The off-road vehicle according to claim 2, wherein:
the inflow tubular portion of the intake tank is closer to the vertical center line in the width direction than the outlet tubular portion of the intercooler is.

4. The off-road vehicle according to claim 2, further comprising:
a transmission; and
a transmission duct connected to the transmission,
wherein:
the inflow tubular portion of the intake tank is located closer to the first side than the outlet tubular portion of the intercooler is; and
the transmission duct is located outside the downstream intake duct in the width direction.

5. The off-road vehicle according to claim 2, further comprising:
another duct different from the upstream intake duct and the downstream intake duct,
wherein the another duct is located outside the upstream intake duct or the downstream intake duct in the width direction and extends in the vertical direction.

6. The off-road vehicle according to claim 2, wherein:
the outlet tubular portion of the intercooler is further away from the vertical center line toward the second side than the inflow tubular portion of the intake tank is;
the outlet tubular portion of the intercooler is away from the inflow tubular portion of the intake tank toward one side in a front-rear direction of the off-road vehicle; and
the inflow tubular portion of the intake tank protrudes diagonally upward with respect to a horizontal direction so as to face the one side in the front-rear direction of the off-road vehicle and the second side of the vertical center line.

7. The off-road vehicle according to claim 2, further comprising:
a relief valve that releases intake air in the intake chamber to an outside of the intake tank when pressure in the intake chamber exceeds a limit value; and
a return tube that connects the relief valve to the supercharger such that a discharge port of the relief valve communicates with the pressurizing space of the supercharger.

8. The off-road vehicle according to claim 7, wherein:
the relief valve is located at a portion of the intake tank which is closer to the supercharger than the inflow tubular portion is.

9. The off-road vehicle according to claim 1, further comprising:
another duct that is connected to the supercharger and is different from the upstream intake duct,
wherein the another duct is located outside the upstream intake duct in the width direction.

10. The off-road vehicle according to claim 1, wherein;
the outflow tubular portion of the supercharger is located outside the inlet tubular portion of the intercooler in the width direction.

11. The off-road vehicle according to claim 1, further comprising:

an internal combustion engine including cylinders; and a throttle body including intake conduits respectively connected to the cylinders and throttle valves respectively located at the intake conduits, wherein the intake tank further includes;

outflow ports respectively communicating with the intake conduits of the throttle body and a diffuser that diffuses intake air, which is flowing from the inflow port toward an intake chamber, into the intake chamber.

12. The off-road vehicle according to claim 1, further comprising:

an internal combustion engine including a cylinder block, wherein a center of the intercooler in the width direction is displaced from a center of the cylinder block toward one side in the width direction.

13. The off-road vehicle according to claim 12, wherein:

the cylinder block includes a cam chain tunnel at an end portion thereof in the width direction, and the cam chain tunnel is located adjacent to the supercharger.

14. The off-road vehicle according to claim 1, further comprising:

an internal combustion engine; and an exhaust pipe connected to the internal combustion engine, wherein the intercooler core is displaced from the exhaust pipe in a horizontal direction.

15. The off-road vehicle according to claim 1, further comprising:

an internal combustion engine;

an exhaust pipe connected to the internal combustion engine; and a fan located at the intercooler, wherein:

the intercooler core is disposed to diagonally extend in a rear-upper direction, relative to a length of the off-road vehicle; and the exhaust pipe is located behind and under the intercooler core, relative to an orientation of the off-road vehicle.

16. The off-road vehicle according to claim 1, wherein:

a rotation axis of the pressurization rotating body extends in the width direction of the intercooler.

17. The off-road vehicle according to claim 1, further comprising:

an internal combustion engine which is located vertically below the intercooler.

18. The off-road vehicle according to claim 17, further comprising:

an engine room cover over the internal combustion engine, the engine room cover having a window opening through which the intercooler is exposed.

19. The off-road vehicle according to claim 18, further comprising:

a protection cover mounted on the engine room cover to cover the window opening from above.

20. The off-road vehicle according to claim 1, further comprising:

a cargo bed located behind the intercooler, the cargo bed including a bottom wall, a front wall, and a pair of side walls that define a storage space.

* * * * *